United States Patent
Chun

(10) Patent No.: US 12,063,593 B2
(45) Date of Patent: Aug. 13, 2024

(54) METHOD FOR TERMINAL TO CONNECT TO NETWORK IN WIRELESS COMMUNICATION SYSTEM

(71) Applicant: LG ELECTRONICS INC., Seoul (KR)

(72) Inventor: Sungduck Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 17/439,697

(22) PCT Filed: Mar. 30, 2020

(86) PCT No.: PCT/KR2020/004342
§ 371 (c)(1),
(2) Date: Sep. 15, 2021

(87) PCT Pub. No.: WO2020/204536
PCT Pub. Date: Oct. 8, 2020

(65) Prior Publication Data
US 2022/0167260 A1 May 26, 2022

(30) Foreign Application Priority Data

Mar. 29, 2019 (KR) .......................... 10-2019-0037297
Apr. 1, 2019 (KR) .......................... 10-2019-0038024

(51) Int. Cl.
*H04W 48/18* (2009.01)
*H04W 60/00* (2009.01)

(52) U.S. Cl.
CPC ........... *H04W 48/18* (2013.01); *H04W 60/00* (2013.01)

(58) Field of Classification Search
CPC ...... H04W 48/00; H04W 48/18; H04W 60/00
(Continued)

(56) References Cited

U.S. PATENT DOCUMENTS

| 2010/0216465 | A1* | 8/2010 | Mubarek | H04W 48/18 370/310 |
| 2012/0100848 | A1* | 4/2012 | Miklos | H04W 16/08 455/432.1 |

(Continued)

FOREIGN PATENT DOCUMENTS

KR  1020160065961  6/2016

OTHER PUBLICATIONS

Oppo, Introducing support for non-public networks and operations on allowed CAG list, S2-1901613, 3GPP TSG-SA WG2 Meeting #131, Tenerife, Spain, Feb. 18, 2019, see sections 5.x.3.1, 5.x.3.3, 5.x.3.4.

(Continued)

*Primary Examiner* — Qutbuddin Ghulamali
(74) *Attorney, Agent, or Firm* — BRYAN CAVE LEIGHTON PAISNER LLP

(57) ABSTRACT

One aspect in the present specification is a method for a terminal to connect to a network in a wireless communication system, wherein the method can include: searching a network usable by the terminal; receiving, from the searched network, information about access groups supported by the searched network; determining, on the basis of the access group information, whether an identifier of the access group included in an allowed access group list preset in the terminal is included in the access group information; receiving, from the searched network, control information related to an access group for selecting the searched network; transmitting a registration request message to the searched network on the basis of the control information; and receiving a response message from the searched network as a response to the registration request message.

14 Claims, 11 Drawing Sheets

(58) Field of Classification Search
USPC .................................................... 455/435.1
See application file for complete search history.

(56) References Cited

U.S. PATENT DOCUMENTS

| | | | | |
|---|---|---|---|---|
| 2014/0179316 | A1* | 6/2014 | Hu | G06Q 10/06 455/435.1 |
| 2016/0242138 | A1* | 8/2016 | Basavaraj | H04W 8/082 |
| 2018/0014178 | A1* | 1/2018 | Baek | H04W 8/20 |
| 2018/0070278 | A1* | 3/2018 | Uemura | H04W 76/10 |
| 2018/0270634 | A1* | 9/2018 | Kim | H04W 72/54 |

OTHER PUBLICATIONS

Oppo, Discussion on update of white/allowed list when NW rejects UE on CAG access attempt, S2-1901612, 3GPP TSG-SA WG2 Meeting #131, Tenerife, Spain, Feb. 18, 2019, see sections 2.1, 2.2.
Oppo, Missing requirements on NW reject and UE's housekeeping of the white list, S2-1901615, 3GPP TSG-SA WG2 Meeting #131, Tenerife, Spain, Feb. 18, 2019, see section 6.2.1.
Ericsson et al., TS 23.502, Introducing non-public network-CAG, S2-1902810, 3GPP TSG-SA WG2 Meeting #131, Tenerife, Spain, Mar. 1, 2019, see sections 4.2.2.2.1, 4.2.2.2.2.

* cited by examiner

[FIG. 1]
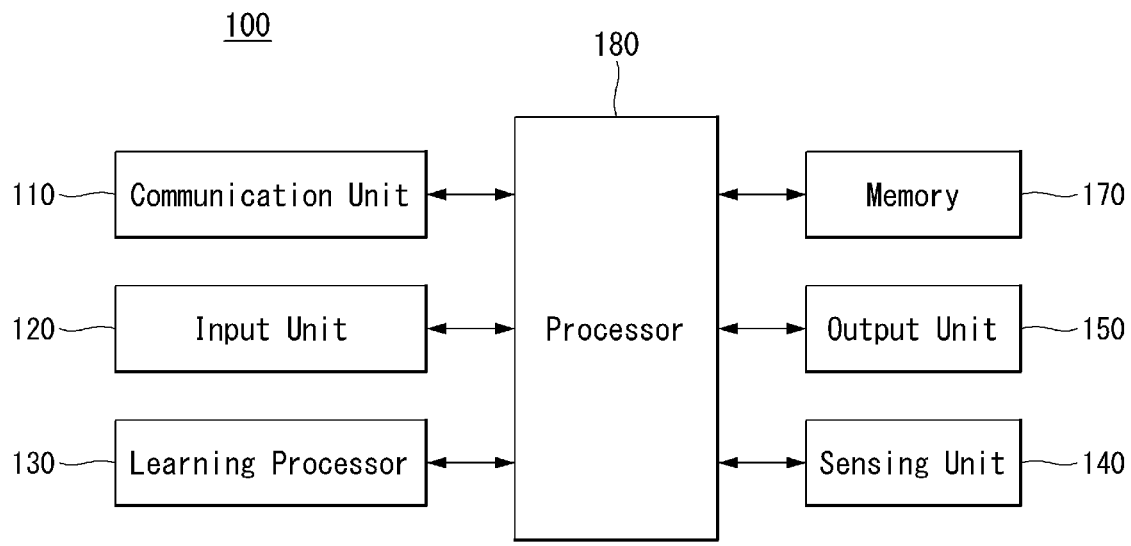
[FIG. 2]
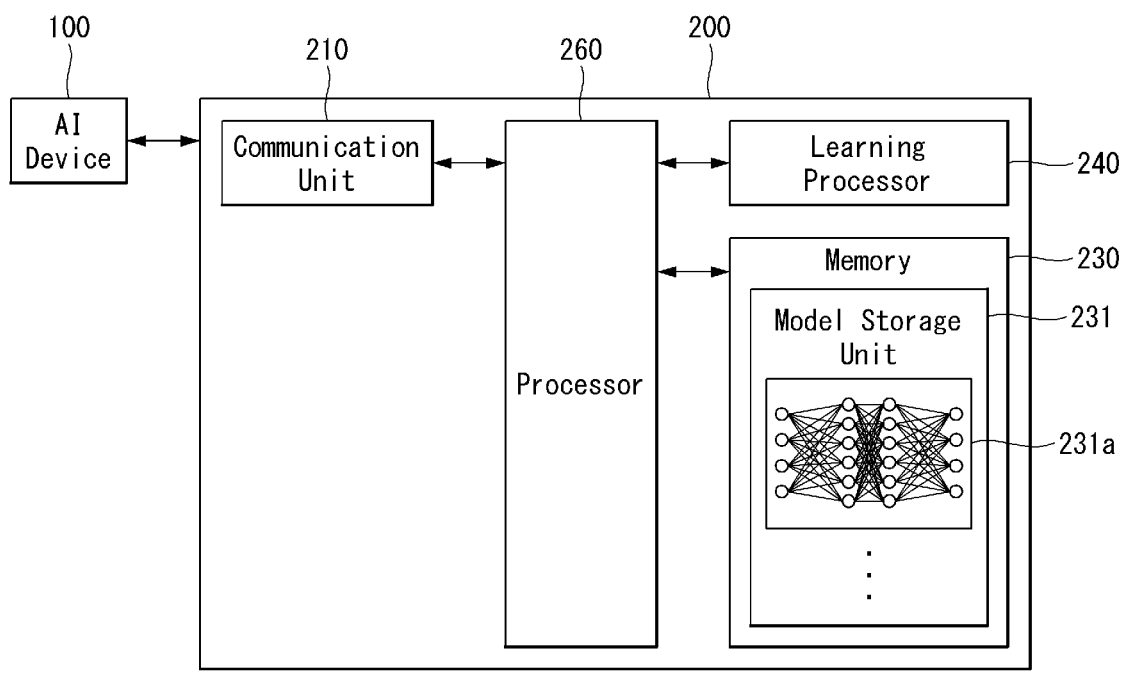

[FIG. 3]
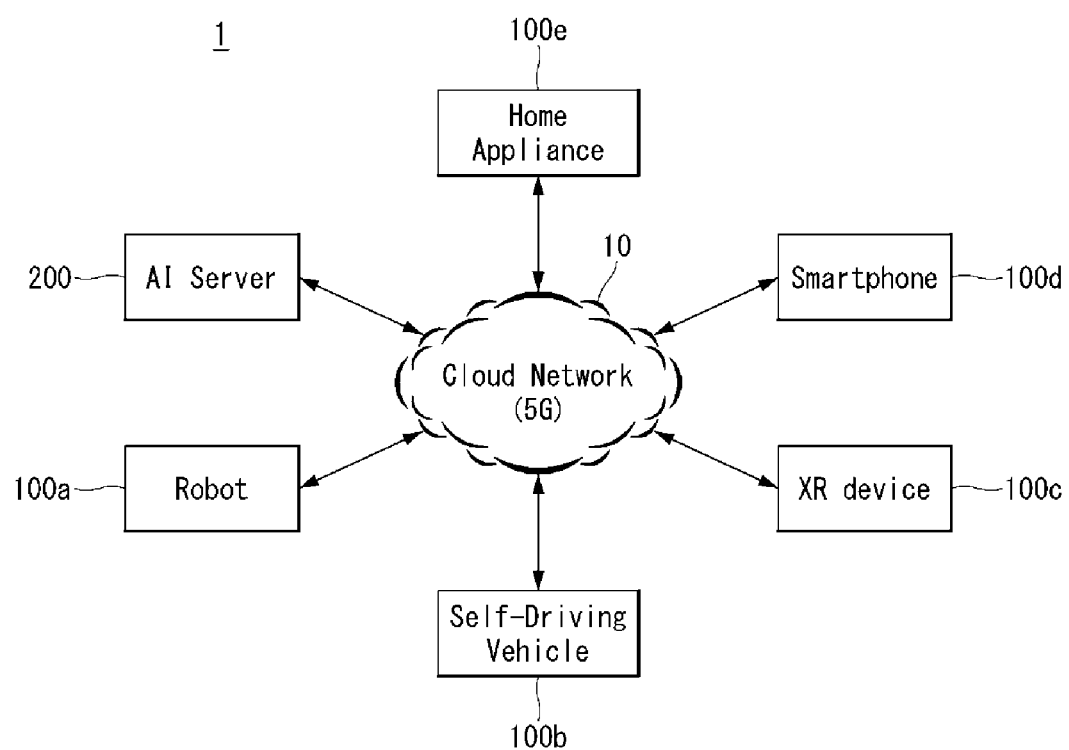

[FIG. 4]
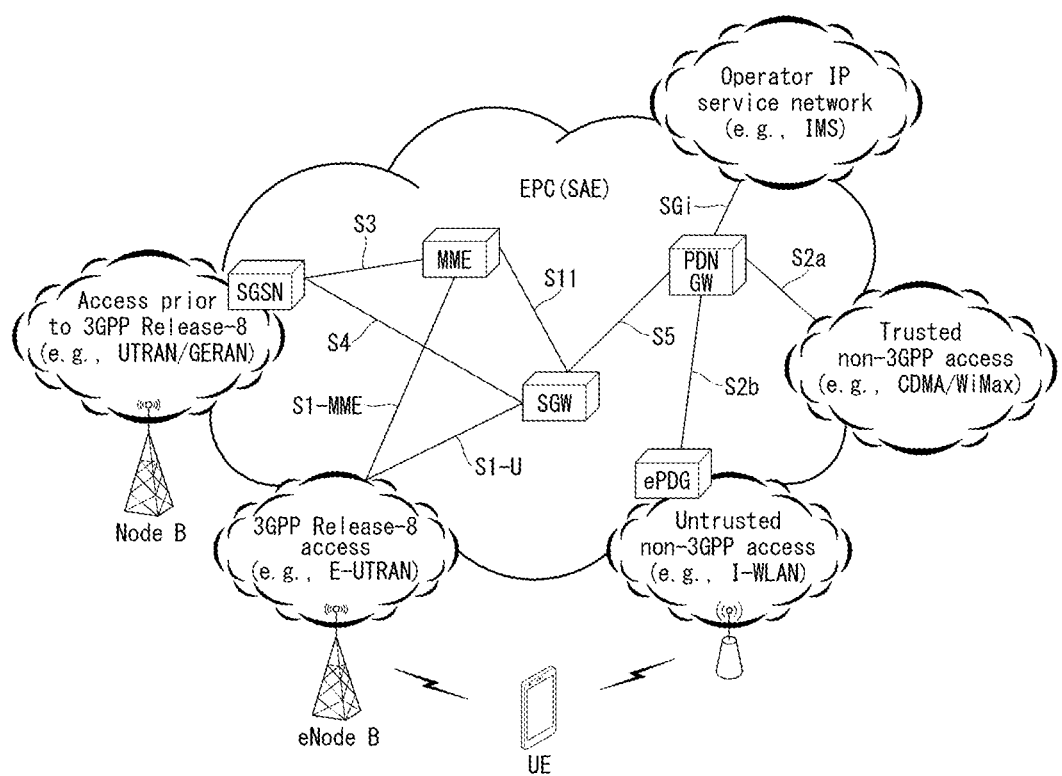

[FIG. 5]
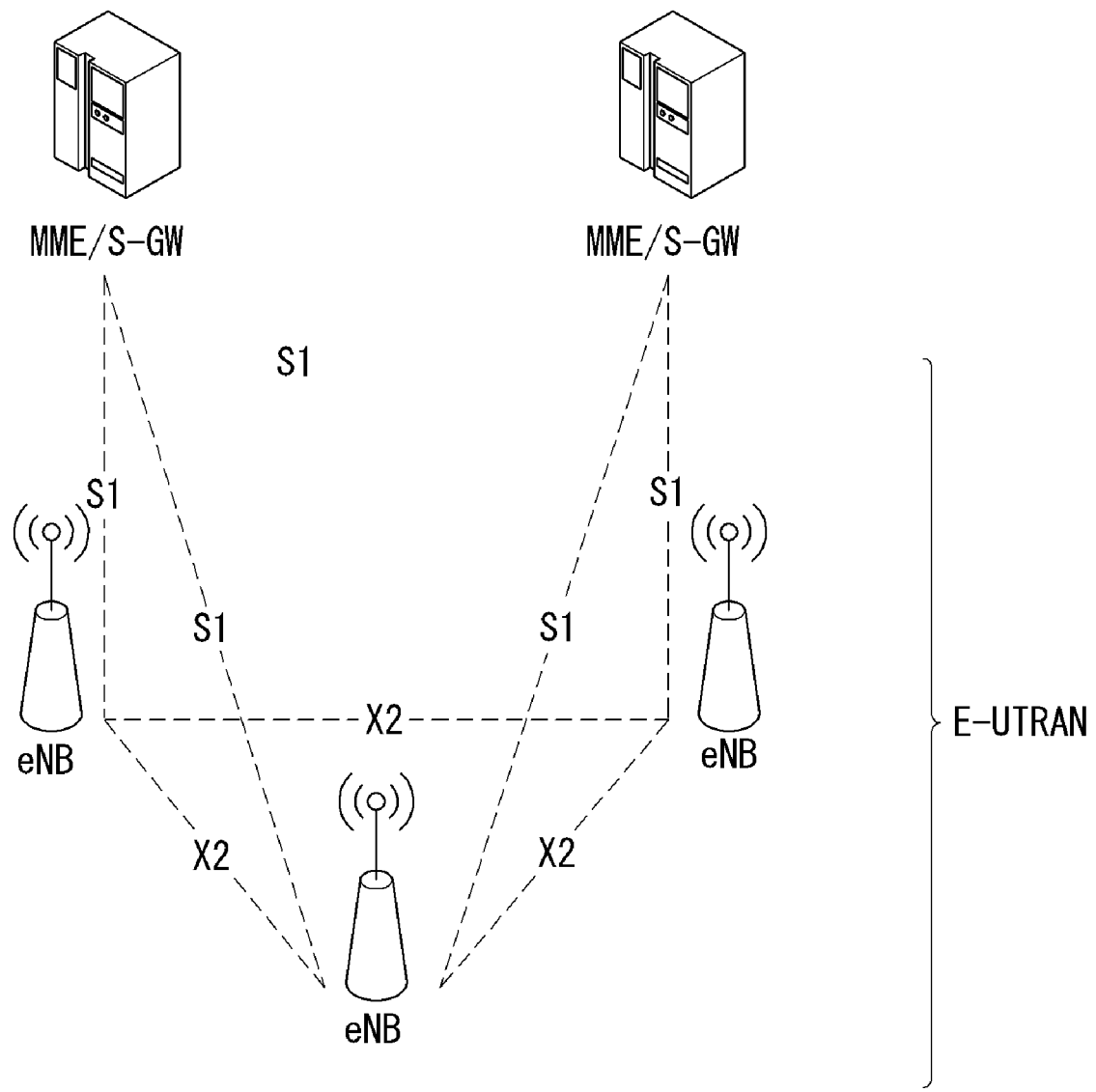

[FIG. 6]
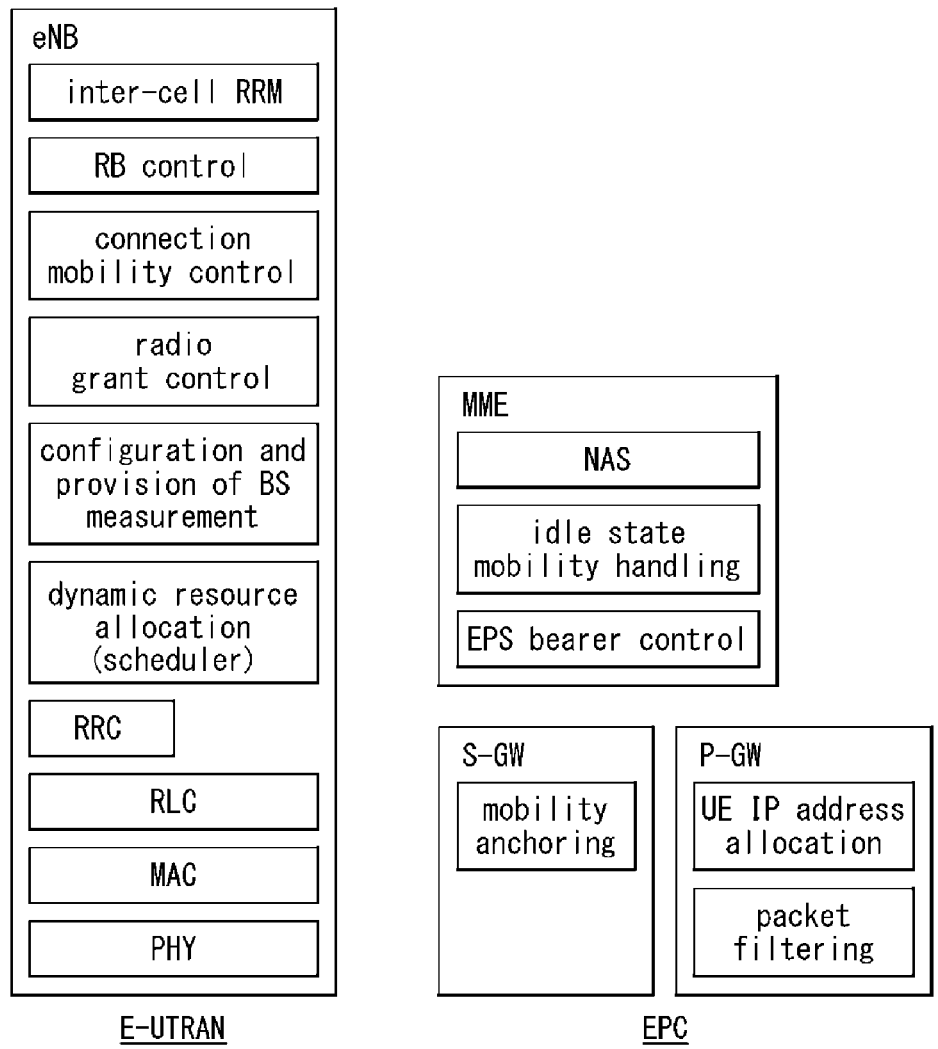
[FIG. 7]
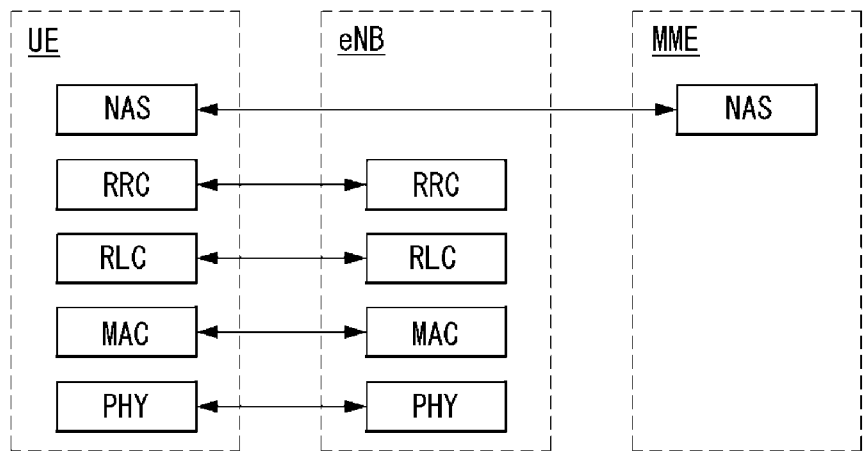

[FIG. 8]
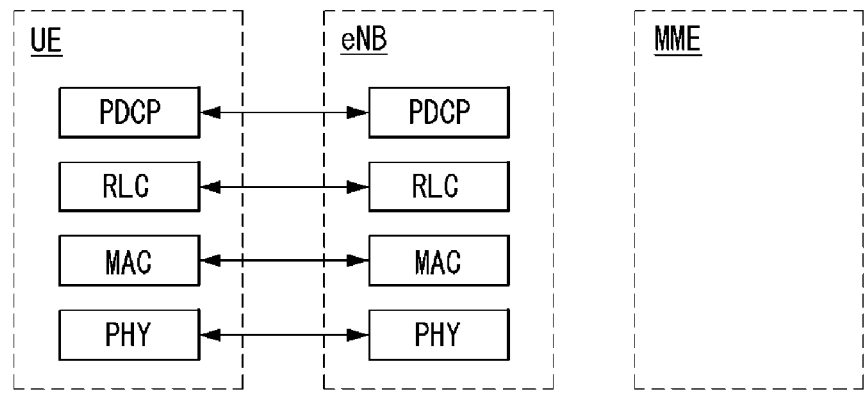
[FIG. 9]
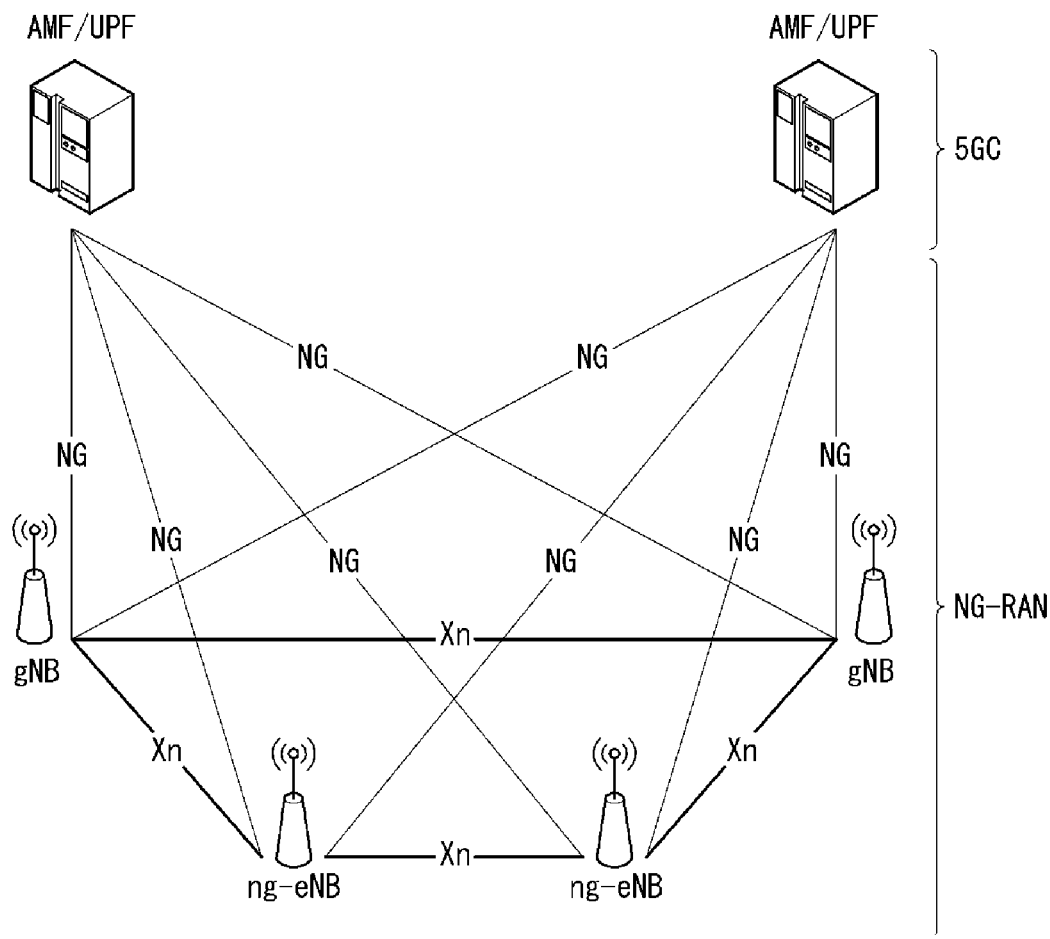

[FIG. 10]
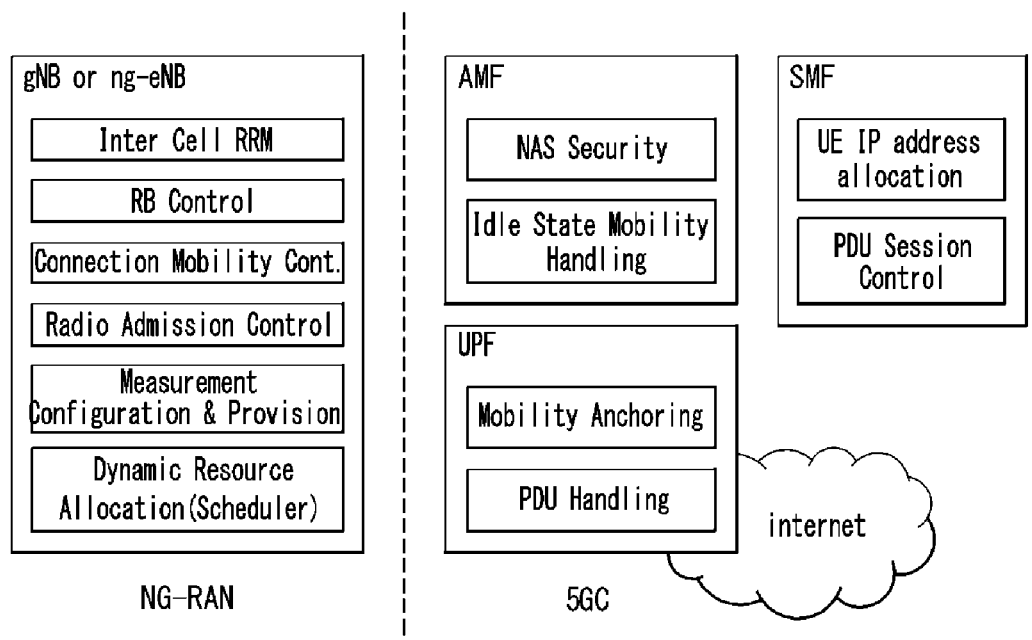
[FIG. 11]
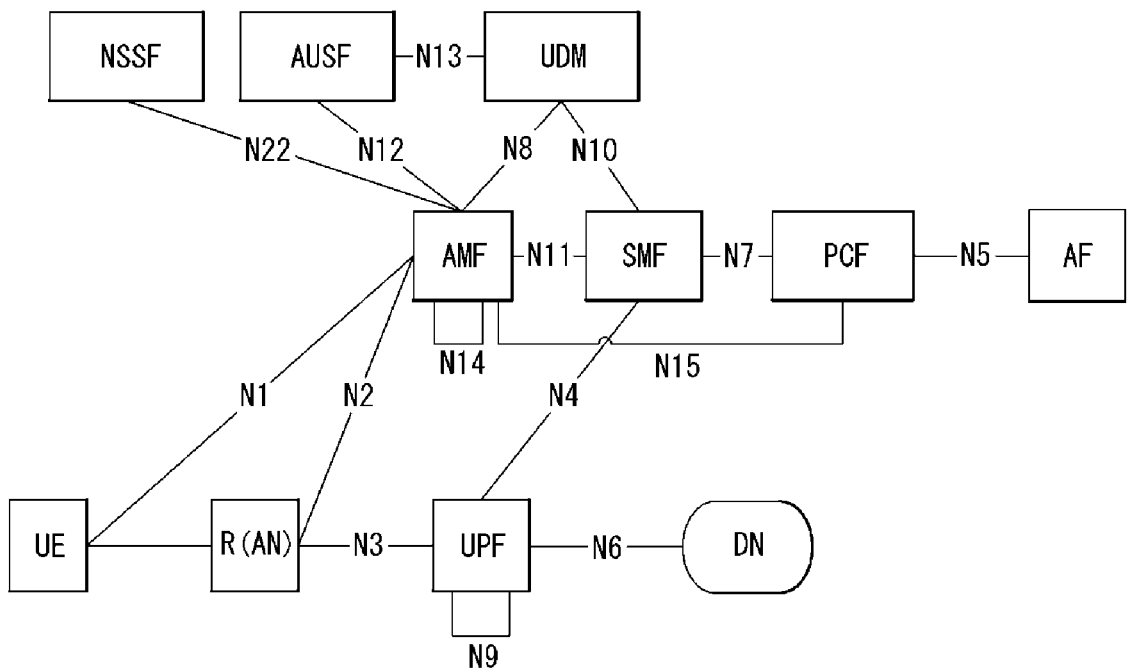

[FIG. 12]
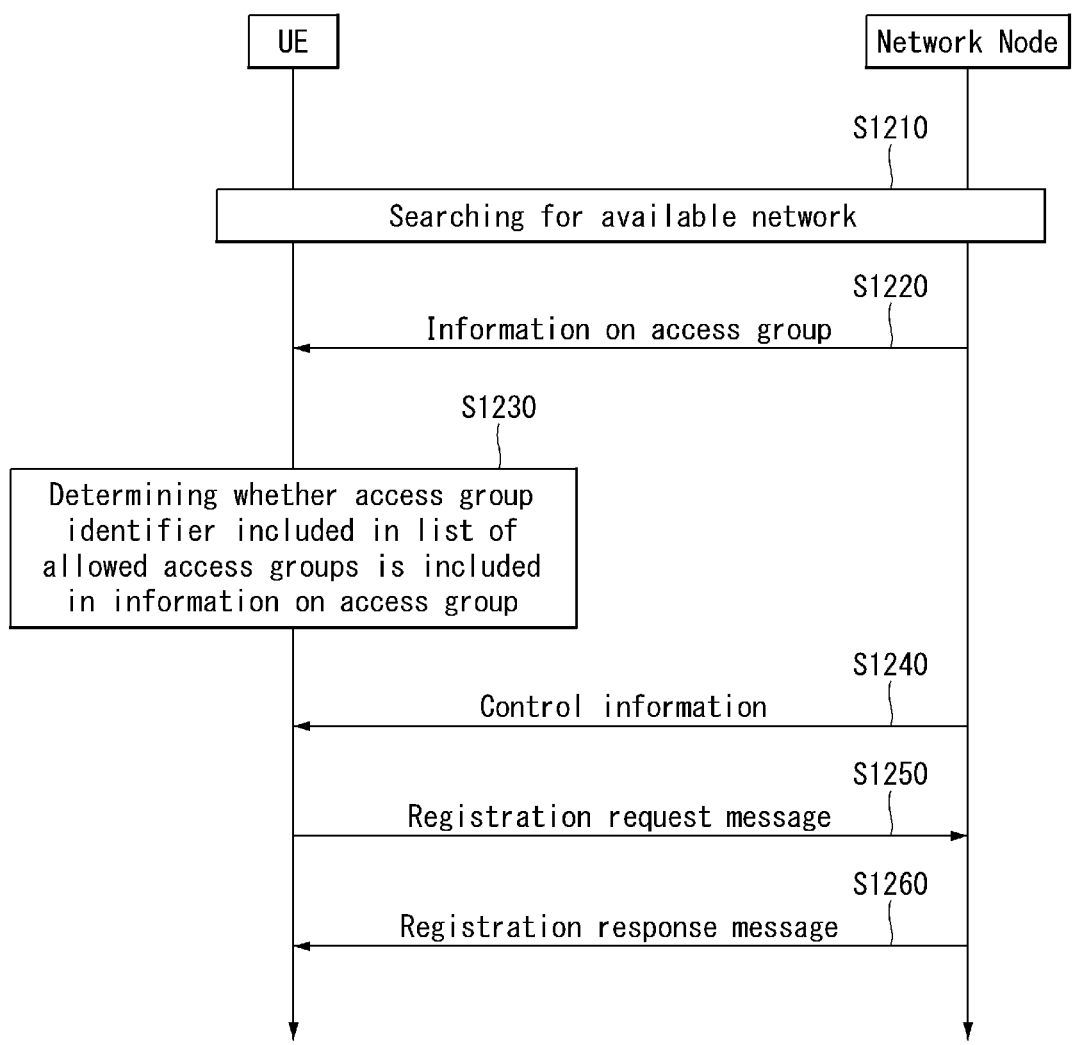

[FIG. 13]
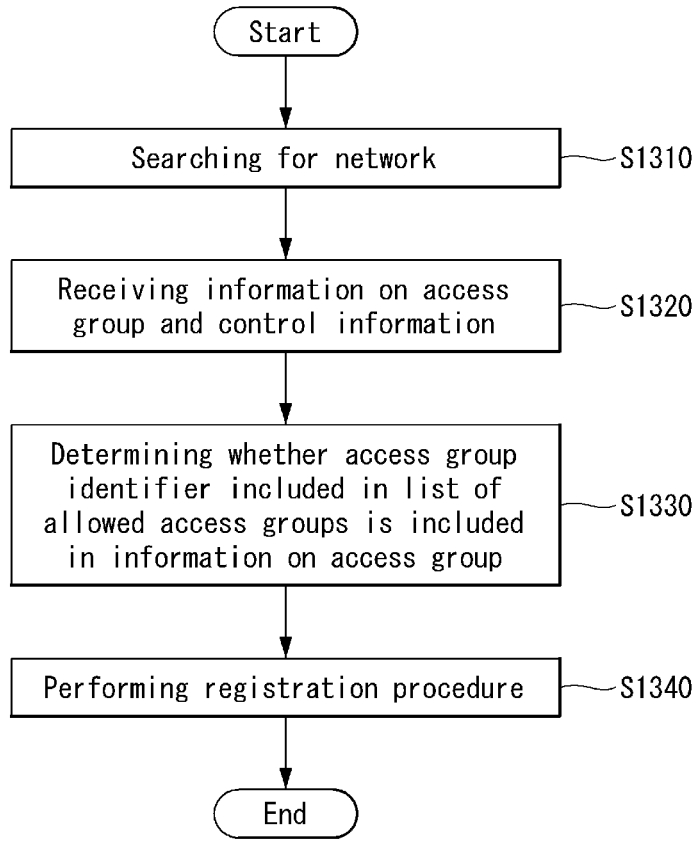
[FIG. 14]
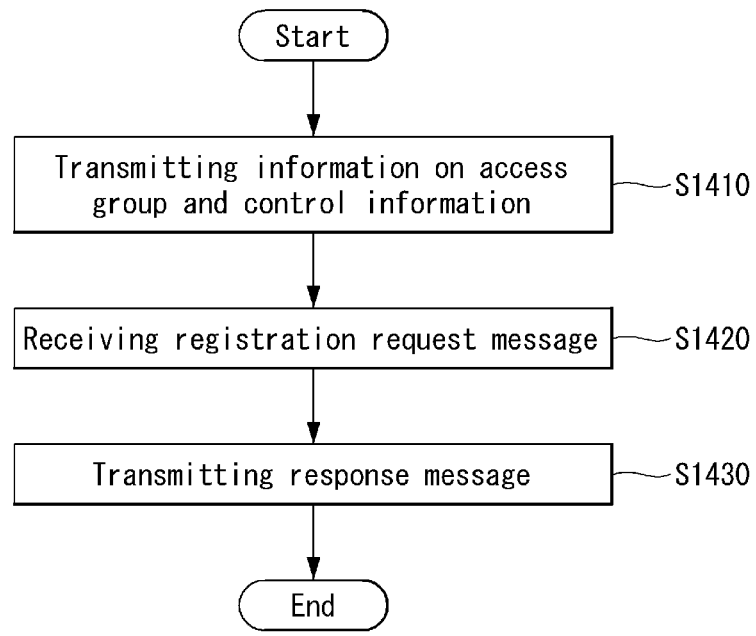

[FIG. 15]
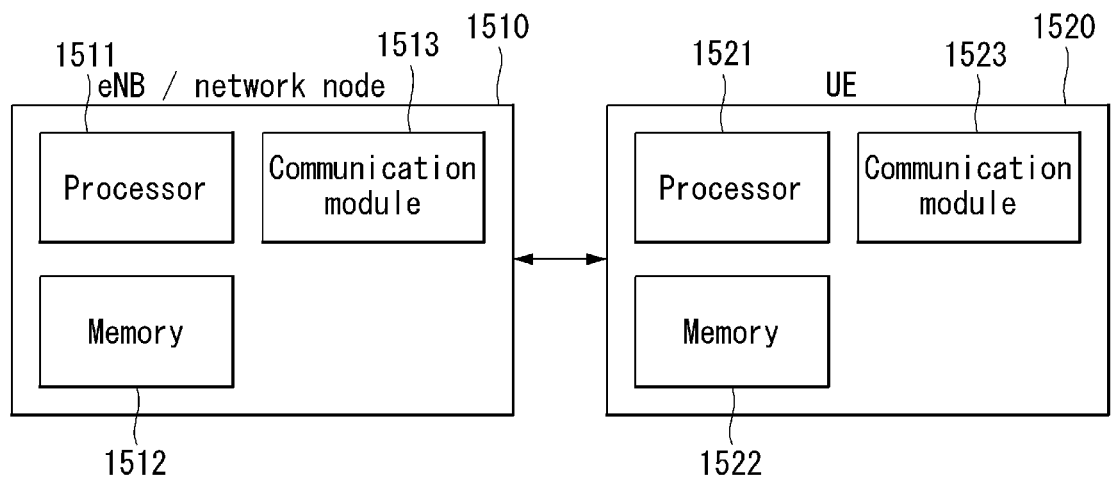
[FIG. 16]
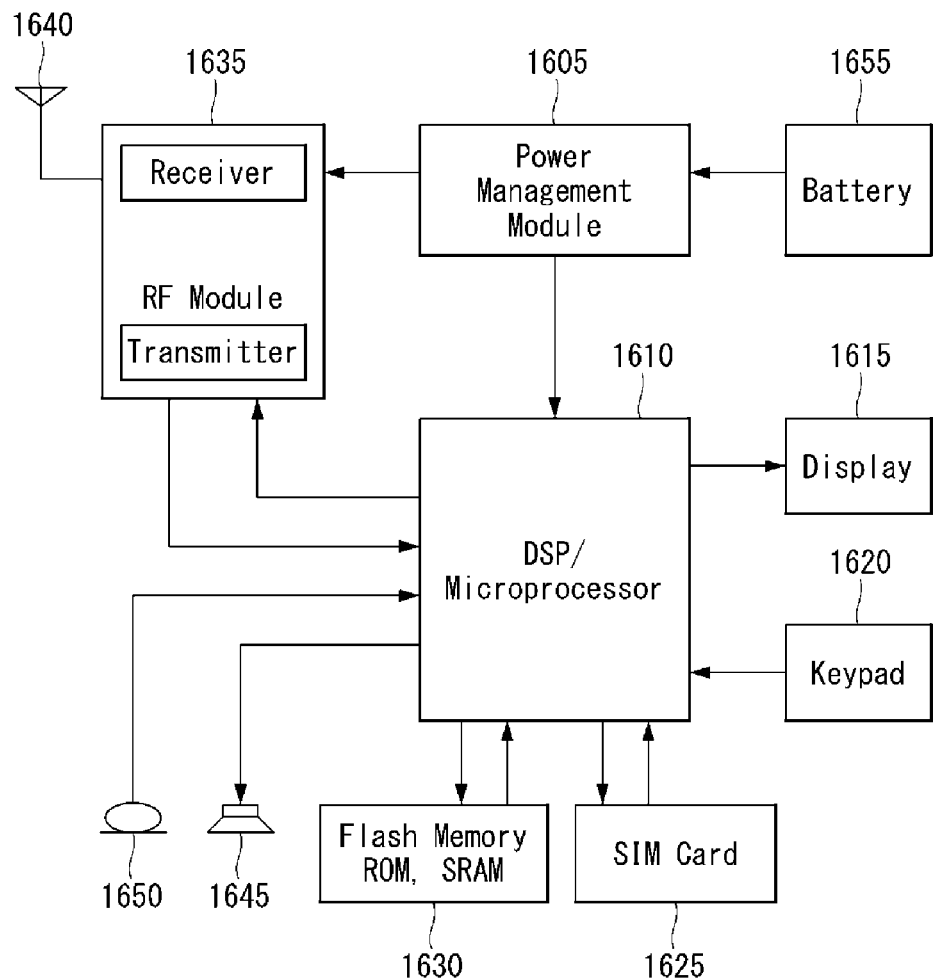

[FIG. 17]
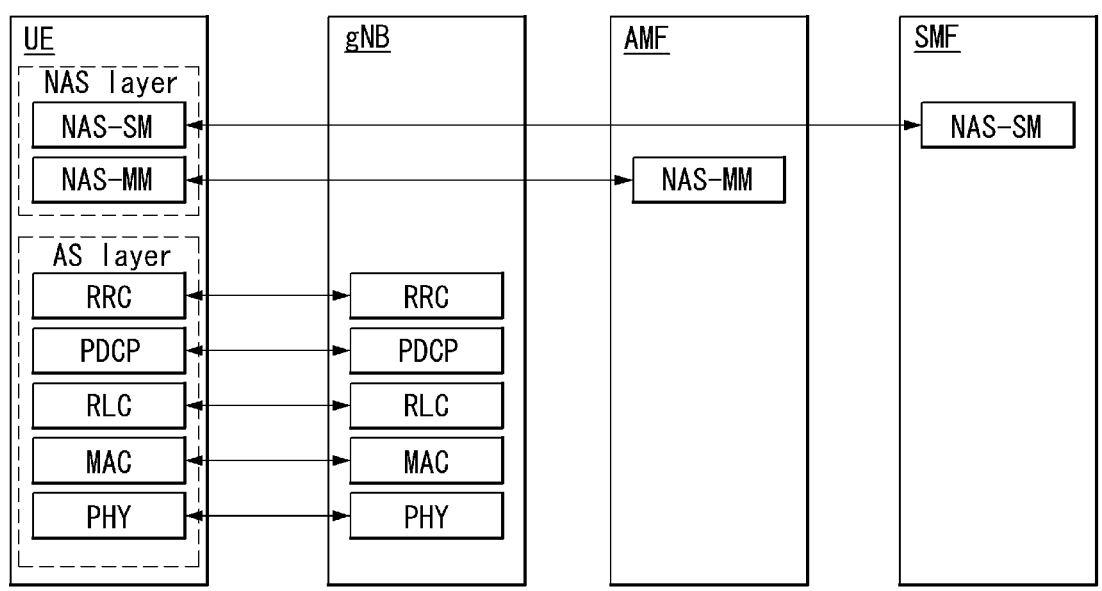

METHOD FOR TERMINAL TO CONNECT TO NETWORK IN WIRELESS COMMUNICATION SYSTEM

This application is the National Stage filing under 35 U.S.C. 371 of International Application No. PCT/KR2020/004342 filed on Mar. 30, 2020, which claims priority to Korean Patent Application Nos. 10-2019-0037297 filed on Mar. 29, 2019 and 10-2019-0038024 filed on Apr. 1, 2019, the contents of which are all hereby incorporated by reference herein in their entirety.

TECHNICAL FIELD

The present disclosure relates to a method of supporting a non-public network for specific users, such as smart factories, enterprise users, and the like. More specifically, when a user equipment (UE) connects to a device such as a dedicated wireless base station installed for the non-public network, in particular, even when there is no preconfigured configuration information for the UE to use a dedicated network, the present disclosure relates to a communication system and method for stably receiving a communication service by allowing the UE to connect to the dedicated network.

BACKGROUND ART

In a wireless communication system, mobile communication systems have been developed to provide a voice service while ensuring the activity of a user. However, the area of the mobile communication systems has extended to a data service in addition to a voice. Due to the current explosive increase in traffic, there is a shortage of resources, and thus users demand a higher speed service. Accordingly, there is a need for a more advanced mobile communication system.

Requirements for next-generation mobile communication systems need to able to support the accommodation of explosive data traffic, a dramatic increase in data rate per user terminal, the accommodation of a significant increase in the number of connected devices, very low end-to-end latency, and high-energy efficiency. To this end, studies have been conducted on various technologies such as dual connectivity, massive multiple input multiple output (MIMO), in-band full duplex, non-orthogonal multiple access (NOMA), super wideband support, and device networking.

DISCLOSURE

Technical Problem

An object of the present disclosure is about a method for a user equipment (UE) to support a non-public network in a wireless communication system.

In addition, another object of the present disclosure is about a method for using a dedicated network even when there is no preconfigured configuration information in the UE in the wireless communication system.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

An aspect of the present disclosure, in a method for a user equipment (UE) to connect to a network in a wireless communication system, the method may include searching for a network usable by the UE; receiving information on an access group supported by the searched network from the searched network; determining whether an access group identifier included in a list of allowed access groups preconfigured in the UE is included in the information on the access group based on the information on the access group; receiving control information related to an access group for selecting the searched network from the searched network; transmitting a registration request message to the searched network based on the control information; and receiving a response message as a response to the registration request message from the searched network.

In addition, the access group may be a closed access group (CAG).

In addition, the searched network may support non public network (NPN).

In addition, the control information may include information indicating that the UE can select the searched network.

In addition, the method may further include selecting the searched network through a manual network selection mode.

In addition, the transmitting the registration request message may be performed when the access group identifier is not included in the information on the access group.

In addition, the information on the access group and the control information may be received through a system information block (Sib) message.

In addition, the method may further include configuring not to perform a network selection procedure or a registration request procedure on the searched network when the response message is a message rejecting a registration request.

Another aspect of the present disclosure, in a method for a network to connect to a user equipment (UE) in a wireless communication system, the method may include transmitting information on an access group supported by the network to the UE; transmitting control information related to an access group for the UE to select the network to the UE; receiving a registration request message from the UE based on the control information; and transmitting a response message, as a response to the registration request message, to the UE.

In addition, the access group may be a closed access group (CAG).

In addition, the searched network may support non public network (NPN).

In addition, the control information may include information indicating that the UE can select the network.

In addition, the information on the access group and the control information may be transmitted through a system information block (Sib) message.

Another aspect of the present disclosure, in a user equipment (UE) connecting to a network in a wireless communication system, the UE may include a transceiver; a memory; and a processor configured to control the transceiver and the memory, wherein the processor may be configured to: search for a network usable by the UE; receive information on an access group supported by the searched network through the transceiver from the searched network; determine whether an access group identifier included in a list of allowed access groups preconfigured in the memory is included in the information on the access group based on the information on the access group; receive control information related to an access group for selecting the searched network through the transceiver from the searched network; transmit a registration request message to the searched network based on the control information; and receive a response message, as a response to the registration request message, from the searched network.

Another aspect of the present disclosure, in a network connecting to a user equipment (UE) in a wireless communication system, the network may include a transceiver; a memory; and a processor configured to control the transceiver and the memory, wherein the processor may be configured to: transmit information on an access group supported by the network through the transceiver to the UE; transmit control information related to an access group for the UE to select the network to the UE; receive a registration request message from the UE based on the control information; and transmit a response message, as a response to the registration request message, to the UE.

Advantageous Effects

Through the present disclosure, in a wireless communication system, a user equipment (UE) may support a non-public network.

In addition, through the present disclosure, in a wireless communication system, the UE can use a dedicated network even when there is no preconfigured configuration information.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 1 illustrates an AI device 100 according to an embodiment of the present disclosure.

FIG. 2 illustrates an AI server 200 according to an embodiment of the present disclosure.

FIG. 3 illustrates an AI system 1 according to an embodiment of the present disclosure.

FIG. 4 illustrates various reference points.

FIG. 5 illustrates an example of a network structure of an evolved universal terrestrial radio access network (E-UTRAN) to which the present disclosure is applicable.

FIG. 6 illustrates an example of a general architecture of E-UTRAN and EPC.

FIG. 7 illustrates an example of a structure of a radio interface protocol in a control plane between a UE and eNB.

FIG. 8 illustrates an example of a structure of a radio interface protocol in a user plane between a UE and eNB.

FIG. 9 illustrates a general architecture of NR-RAN.

FIG. 10 illustrates an example of general functional split between NG-RAN and 5GC.

FIG. 11 illustrates an example of a general architecture of 5G.

FIG. 12 is an embodiment to which the present disclosure can be applied.

FIG. 13 is an embodiment of a UE to which the present disclosure can be applied.

FIG. 14 is an embodiment of a network to which the present disclosure can be applied.

FIG. 15 illustrates a block diagram of configuration of a communication device according to an embodiment of the present disclosure.

FIG. 16 illustrates a block diagram of configuration of a communication device according to an embodiment of the present disclosure.

FIG. 17 illustrates an example of a structure of a radio interface protocol in a control plane between a UE and eNodeB.

MODE FOR INVENTION

Reference will now be made in detail to embodiments of the disclosure, examples of which are illustrated in the accompanying drawings. A detailed description to be disclosed below together with the accompanying drawing is to describe exemplary implementations of the present disclosure and not to describe a unique implementation for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Description of Terms in the Present Disclosure

In the present disclosure, a base station (BS) refers to a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced by terms such as a fixed station, Node B, evolved-NodeB (eNB), a base transceiver system (BTS), an access point (AP), and gNB (general NB). Further, a 'terminal' may be fixed or movable and may be replaced by terms such as user equipment (UE), a mobile station (MS), a user terminal (UT), a mobile subscriber station (MSS), a subscriber station (SS), an advanced mobile station (AMS), a wireless terminal (WT), a machine type communication (MTC) device, a machine-to-machine (M2M) device, and a device-to-device (D2D) device.

In the present disclosure, downlink (DL) refers to communication from the base station to the terminal, and uplink (UL) refers to communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and non-orthogonal multiple access (NOMA).

The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, and E-UTRA (evolved UTRA). The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in downlink and adopts the SC-FDMA in uplink. LTE-advanced (A) is an evolution of the 3GPP LTE.

Embodiments of the present disclosure can be supported by standard documents disclosed in at least one of the IEEE 802, 3GPP, and 3GPP2 specifications regarding wireless access systems. In other words, in embodiments of the present disclosure, those steps or parts omitted for the purpose of clearly describing technical principles of the present disclosure can be supported by the standard documents. All the terms disclosed in the present disclosure can also be explained by the standard documents.

3GPP LTE/LTE-A is primarily described for clear description, but technical features of the present disclosure are not limited thereto.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an internet protocol (IP) based packet switched core network, and an access network such as LTE and UTRAN. The EPS is a network of an evolved version of UMTS.

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE may refer to terms such as a terminal, a mobile equipment (ME), and a mobile station (MS). The UE can be a portable device such as a notebook computer, a cellular phone, a personal digital assistant (PDA), a smart phone, and a multimedia device, or a non-portable device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MTC apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) and eNodeB controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): a network node in the EPS network which performs mobility management and session management functions.

Packet Data Network Gateway (PDN-GW): a network node in the EPS network which performs UE IP address allocation, packet screening and filtering, and charging data collection functions.

Serving GW (Serving Gateway): a network node in the EPS network which performs functions such as mobility anchor, packet routing, idle mode packet buffering, and triggering of paging for the UE of MME.

Policy and Charging Rule Function (PCRF): a node in the EPS network which performs policy decision to dynamically apply differentiated QoS and billing policies per each service flow.

Open Mobile Alliance Device Management (OMA DM): A protocol designed to manage mobile devices, such as mobile phones, PDAs, and portable computers, which performs functions such as device configuration, firmware upgrade, and error report Operation Administration and Maintenance (OAM): A network management function group which provides network fault indication, performance information, and data and diagnostic functions.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and S1 signaling connection between the eNB and the MME. When the ECM connection is established/terminated, the RRC and S1 signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Cell as a radio resource: the 3GPP LTE/LTE-A system has used a concept of a cell to manage radio resources, and a cell related to the radio resource is distinguished from a cell of a geographic area. The "cell" related to the radio resource is defined as a combination of downlink (DL) resources and uplink (UL) resources, i.e., a combination of DL carriers and UL carriers. The cell may be configured with DL resource only or a combination of DL resources and UL resources. If carrier aggregation is supported, a linkage between a carrier frequency of the DL resource and a carrier frequency of the UL resource may be indicated by system information. Here, the carrier frequency refers to a center frequency of each cell or carrier. In particular, a cell operating on a primary frequency is called a primary cell or Pcell, and a cell operating on a secondary frequency is called a secondary cell or Scell. The Scell refers to a cell that can be configured after radio resource control (RRC) connection establishment is achieved and can be used for providing additional radio resources. Depending on capabilities of the UE, the Scell together with the Pcell can form a set of serving cells for the UE. For the UE that is in a RRC_CONNECTED state but is not configured with carrier aggregation, or does not support carrier aggregation, there is only one serving cell configured with only the Pcell. The "cell" of the geographic area can be understood as a coverage in which a node can provide services using a carrier, and the "cell" of the radio resource is related to a bandwidth (BW) that is a frequency range configured by the carrier. Since a downlink coverage that is a range within which the node can transmit a valid signal and an uplink coverage that is a range within which the node can receive the valid signal from the UE depend on the carrier carrying the corresponding signal, the coverage of the node is associated with the coverage of the "cell" of the radio resource the node uses. Thus, the term "cell" may be used to sometimes denote the coverage of the service by the node, sometimes denote the radio resource, and sometimes denote a range that a signal using the radio resources can reach with a valid strength.

The EPC is a key element of system architecture evolution (SAE) to improve the performance of 3GPP technologies. The SAE corresponds to a research project to determine a network structure supporting mobility between various kinds of networks. The SAE aims to provide an optimized packet-based system, for example, supporting various radio access technologies on an IP basis and providing more improved data transfer capability.

More specifically, the EPC is a core network of an IP mobile communication system for the 3GPP LTE system and can support packet-based real-time and non-real time services. In the existing mobile communication system (i.e., in the 2nd or 3rd mobile communication system), functions of the core network have been implemented through two separate sub-domains including a circuit-switched (CS) sub-domain for voice and a packet-switched (PS) sub-domain for data. However, in the 3GPP LTE system that is an evolution of the 3rd mobile communication system, the CS and PS sub-domains have been unified into a single IP domain. That is, in the 3GPP LTE system, a connection between UEs having IP capabilities can be configured via an IP-based base station (e.g., evolved Node B (eNodeB)), an EPC, and an application domain (e.g., IP multimedia subsystem (IMS)). In other words, the EPC is an essential architecture to implement end-to-end IP services.

The EPC may include various components, and FIG. 1 illustrates some of the EPC components, including a serving gateway (SGW), a packet data network gateway (PDN GW), a mobility management entity (MME), a SGSN (serving GPRS (general packet radio service) supporting node), and an enhanced packet data gateway (ePDG).

The SGW (or S-GW) operates as a boundary point between a radio access network (RAN) and a core network, and is an element that functions to maintain a data path between the eNB and the PDN GW. Further, if the UE moves across areas served by the eNB, the SGW serves as a local mobility anchor point. That is, packets can be routed through the SGW for mobility within the E-UTRAN (evolved-universal mobile telecommunications system (UMTS) terrestrial radio access network defined in 3GPP Release-8 or later). The SGW may also serve as an anchor point for mobility with other 3GPP networks (RAN defined before 3GPP Release-8, for example, UTRAN or GERAN (global system for mobile communication (GSM)/enhanced data rates for global evolution (EDGE) radio access network).

The PDN GW (or P-GW) corresponds to a termination point of a data interface to a packet data network. The PDN GW can support policy enforcement features, packet filtering, charging support, and the like. In addition, the PDN GW can serve as an anchor point for mobility management between the 3GPP network and a non-3GPP network (e.g., untrusted networks such as an interworking wireless local area network (I-WLAN) or trusted networks such as a code division multiple access (CDMA) network and Wimax).

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may focus on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity in which they are always turned on in order to push real-time information and notification to a user. A cloud storage and application suddenly increases in the mobile communication platform, and this can be applied to both business and entertainment. Furthermore, the cloud storage is a special use case that tows the growth of an uplink data transfer rate. 5G is also used for remote business of cloud. When a tactile interface is used, further lower end-to-end latency is required to maintain better user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use cases relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of megabits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in VR games, in order for game companies to minimize latency, a core server may need to be integrated with the edge network server of a network operator.

An automotive is expected to be an important and new motive power in 5G, along with many use cases for the mobile communication of an vehicle. For example, entertainment for a passenger requires a high capacity and a high mobility mobile broadband at the same time. This reason is that future users continue to expect a high-quality connection regardless of their location and speed. Another use example of the automotive field is an augmented reality dashboard. The augmented reality dashboard overlaps and displays information, that identifies an object in the dark and notifies a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will focus on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. Similar configuration may be performed for each home. All of a temperature sensor, a window and heating controller, a burglar alarm and home appliances are wirelessly connected. Many of these sensors are typically a low data transfer rate, low energy and low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of suppliers and consumers, and thus the smart grid may improve the distribution of fuel, such as electricity, in an efficient, reliable, economical, production-sustainable and automated manner. The smart grid may be considered to be another sensor network with low latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically demands a low data speed, but requires a wide area and reliable location information.

Embodiments of the present disclosure to be described below can be implemented through the combination or the modification in order to meet the 5G requirements described above.

The following is described in detail in relation to the technical field to which embodiments of the present disclosure to be described below can be applied.

Artificial Intelligence (AI)

Artificial intelligence means the field in which artificial intelligence or methodology capable of making the artificial intelligence is researched. Machine learning means the field in which various problems handled in the artificial intelligence field are defined and methodology for solving the problems is researched. Machine learning is also defined as an algorithm for improving performance of a task through continuous experiences for the task.

An artificial neural network (ANN) is a model used in machine learning, and may refer to the entire model with a problem-solving ability which consists of artificial neurons (nodes) forming a network through a combination of synapses. The artificial neural network may be defined by a connection pattern between neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weights, and bias that are input through a synapse.

A model parameter means a parameter determined through learning, and includes the weight of a synapse connection and the bias of a neuron. Furthermore, a hyper parameter refers to a parameter that shall be configured before learning in a machine learning algorithm, and includes a learning rate, the number of times of repetitions, a mini-deployment size, and an initialization function.

The purpose of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. The deep learning is part of the machine learning. Hereinafter, the machine learning is used as a meaning including the deep learning.

Robot

A robot may mean a machine that automatically processes a given task or operates based on an autonomously owned ability. Particularly, a robot having a function for recognizing and autonomously determining an environment and performing an operation may be called an intelligent robot.

The robot may be classified for industry, medical treatment, home, and military based on its use purpose or field.

The robot includes a driver including an actuator or motor, and can perform various physical operations, such as moving a robot joint. Furthermore, a movable robot includes a wheel, a brake, a propeller, etc. in the driver, and may run on the ground or fly in the air through the driver.

Self-Driving (Autonomous-Driving)

Self-driving means a technology for autonomous driving. A self-driving vehicle means a vehicle that runs without user manipulation or by user's minimum manipulation.

For example, self-driving may include all of a technology for maintaining a driving lane, a technology for automatically controlling speed such as adaptive cruise control, a technology for automatically driving along a fixed path, a technology for automatically setting and driving a path when a destination is set, and the like.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this instance, the self-driving vehicle may be considered as a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object together. However, there is a difference in that a virtual object is used to supplement a real object in the AR technology, and on the other hand, a virtual object and a real object are used as the same character in the MR technology.

The XR technology can be applied to a head-mount display (HMD), a head-up display (HUD), a mobile phone, a tablet PC, a laptop, a desktop, TV, a digital signage, and the like. A device to which the XR technology is applied may be called an XR device.

FIG. 1 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from the external devices.

Examples of communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

The input unit 120 may include a camera for an image signal input, a microphone for receiving an audio signal, a user input unit for receiving information from a user, etc. Herein, the camera or the microphone is treated as a sensor, and thus a signal obtained from the camera or the microphone may be referred to as sensing data or sensor information.

The input unit 120 can obtain learning data for model learning and input data to be used when an output is obtained using a learning model. The input unit 120 can obtain not-processed input data. In this case, the processor 180 or the learning processor 130 can extract an input feature by performing pre-processing on the input data.

The learning processor 130 may be trained by a model constructed by an artificial neural network using learning data. In this case, the trained artificial neural network may be called a learning model. The learning model may be used to deduce a result value of new input data not learning data, and the deduced value may be used as a base for performing a given operation.

The learning processor 130 can perform AI processing along with a learning processor 240 of the AI server 200.

The learning processor 130 may include a memory integrated or implemented in the AI device 100. Alternatively, the learning processor 130 may be implemented using the memory 170, an external memory directly coupled to the AI device 100, or a memory maintained in an external device.

The sensing unit 140 can obtain at least one of internal information of the AI device 100, surrounding environment information of the AI device 100, or user information using various sensors.

Examples of sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 can generate an output related to a visual sense, an auditory sense or a tactile sense.

The output unit 150 may include a display for outputting visual information, a speaker for outputting auditory information, and a haptic module for outputting tactile information.

The memory 170 can store data supporting various functions of the AI device 100. For example, the memory 170 can store input data obtained by the input unit 120, learning data, a learning model, a learning history, etc.

The processor 180 can determine at least one executable operation of the AI device 100 based on information that is determined or generated using a data analysis algorithm or a machine learning algorithm. Furthermore, the processor 180 can perform operation determined by controlling the components of the AI device 100.

To this end, the processor 180 can request, search, receive, or utilize data of the learning processor 130 or the memory 170, and can control the components of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 can obtain intention information for a user input and transmit user requirements based on the obtained intention information.

The processor 180 can obtain the intention information corresponding to the user input using at least one of a speech to text (STT) engine for converting a voice input into a text string or a natural language processing (NLP) engine for obtaining intention information of a natural language.

In this case, at least one of the STT engine or the NLP engine may be constructed by an artificial neural network of which at least a portion is trained according to a machine learning algorithm. Furthermore, at least one of the STT engine or the NLP engine may have been trained by the learning processor 130, may have been trained by the learning processor 240 of the AI server 200, or may have been trained by distributed processing thereof.

The processor 180 may collect history information including the feedback, etc. of the user for the operation contents or an operation of the AI device 100, and may store the history information in the memory 170 or the learning processor 130 or may transmit the history information to an external device such as the AI server 200. The collected history information may be used to update a learning model.

The processor 180 may control at least some of the components of the AI device 100 in order to run an application program stored in the memory 170. Moreover, the processor 180 may combine and operate two or more of the components included in the AI device 100 in order to run the application program.

FIG. 2 illustrates an AI server 200 according to an embodiment of the present disclosure.

Referring to FIG. 2, the AI server 200 may refer to a device which is trained by an artificial neural network using a machine learning algorithm or which uses a trained artificial neural network. Herein, the AI server 200 consists of a plurality of servers and may perform distributed processing and may be defined as a 5G network. Further, the AI server 200 may be included as a partial configuration of the AI device 100 and may perform at least a part of AI processing.

The AI server 200 may include a communication unit 210, a memory 230, a learning processor 240, and a processor 260.

The communication unit 210 may transmit and receive data to and from an external device such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network, or may be mounted on an external device such as the AI device 100 and used.

The learning model may be implemented as hardware, software or a combination of hardware and software. If a part or all of the learning model is implemented as software, one or more instructions constructing the learning model may be stored in the memory 230.

The processor 260 may deduce a result value of new input data using the learning model and generate a response or a control command based on the deduced result value.

FIG. 3 illustrates an AI system 1 according to an embodiment of the present disclosure.

Referring to FIG. 3, in the AI system 1, at least one of the AI server 200, a robot 100a, a self-driving vehicle 100b, an XR device 100c, a smartphone 100d, or home appliances 100e is connected to a cloud network 10. The robot 100a, the self-driving vehicle 100b, the XR device 100c, the smartphone 100d or the home appliances 100e to which the AI technology is applied may be called AI devices 100a to 100e.

The cloud network 10 may constitute part of cloud computing infra or may mean a network present within cloud computing infra. The cloud network 10 may be configured using the 3G network, the 4G or long term evolution (LTE) network, or the 5G network.

That is, the devices 100a to 100e and 200 constituting the AI system 1 may be interconnected over the cloud network 10. In particular, the devices 100a to 100e and 200 may communicate with each other through a base station, or may directly communicate with each other without the intervention of the base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that are AI devices constituting the AI system 1, over the cloud network 10, and may help at least part of the AI processing of the connected AI devices 100a to 100e.

The AI server 200 can train an artificial neural network based on a machine learning algorithm in place of the AI devices 100a to 100e, and can directly store a learning model or transmit the learning model to the AI devices 100a to 100e.

The AI server 200 can receive input data from the AI devices 100a to 100e, deduce a result value of the received input data using the learning model, generate a response or control command based on the deduced result value, and transmit the response or control command to the AI devices 100a to 100e.

Alternatively, the AI devices 100a to 100e can directly deduce a result value of input data using a learning model, and can generate a response or a control command based on the deduced result value.

Various implementations of the AI devices 100a to 100e to which the above-described technologies are applied are described below. Herein, the AI devices 100a to 100e illustrated in FIG. 3 may be considered as detailed implementations of the AI device 100 illustrated in FIG. 1.

AI and Robot to which the Present Disclosure is Applicable

The AI technology is applied to the robot 100a, and the robot 100a may be implemented as a guidance robot, a transport robot, a cleaning robot, a wearable robot, an entertainment robot, a pet robot, an unmanned aerial robot, etc.

The robot 100a may include a robot control module for controlling an operation. The robot control module may mean a software module or a chip in which a software module is implemented using hardware.

The robot 100a may obtain status information of the robot 100a, detect (recognize) a surrounding environment and an object, generate map data, determine a moving path and a running plan, determine a response to a user interaction, or determine an operation, using sensor information obtained from various types of sensors.

The robot 100a may use sensor information obtained by at least one sensor of LIDAR, a radar, and a camera in order to determine the moving path and the running plan.

The robot 100a may perform the above operations using a learning model consisting of at least one artificial neural network. For example, the robot 100a may recognize a surrounding environment and an object using the learning model, and determine an operation using the recognized surrounding environment information or object information. Herein, the learning model may have been directly trained in the robot 100a or may have been trained in an external device such as the AI server 200.

The robot 100a may directly generate results using the learning model and perform an operation, but may perform an operation by transmitting sensor information to an external device such as the AI server 200 and receiving results generated in response to this.

The robot 100a may determine the moving path and the running plan using at least one of map data, object information detected from sensor information, or object information obtained from the external device. The robot 100a may run along the determined moving path and running plan by controlling the driver.

The map data may include object identification information for various objects disposed in the space in which the robot 100a moves. For example, the map data may include object identification information for fixed objects, such as a wall and a door, and movable objects, such as a flowerport and a desk. Furthermore, the object identification information may include a name, a type, a distance, a location, etc.

Furthermore, the robot 100a may perform an operation or run by controlling the driver based on a user's control/interaction. In this case, the robot 100a may obtain intention information of interaction according to a user's behavior or voice utterance, may determine a response based on the obtained intention information, and may perform an operation.

AI and Self-Driving to which the Present Disclosure is Applicable

The AI technology is applied to the self-driving vehicle 100b, and the self-driving vehicle 100b may be implemented as a mobile robot, a vehicle, an unmanned aerial vehicle, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as the component of the self-driving vehicle 100b, but may be configured as separate hardware outside the self-driving vehicle 100b and connected to the self-driving vehicle 100b.

The self-driving vehicle 100b may obtain status information of the self-driving vehicle 100b, detect (recognize) a surrounding environment and object, generate map data, determine a moving path and a running plan, or determine an operation, using sensor information obtained from various types of sensors.

In order to determine the moving path and the running plan, the self-driving vehicle 100b may use sensor information obtained from at least one sensor among LIDAR, a radar and a camera, in the same manner as the robot 100a.

Particularly, the self-driving vehicle 100b may recognize an environment or an object in an area in which a sight is blocked or an area of a predetermined distance or more by receiving sensor information from external devices, or may receive information that is directly recognized from the external devices.

The self-driving vehicle 100b may perform the above operations using a learning model consisting of at least one artificial neural network. For example, the self-driving vehicle 100b may recognize a surrounding environment and object using a learning model and determine a running path using the recognized surrounding environment information or object information. Herein, the learning model may have been directly trained in the self-driving vehicle 100b or may have been trained in an external device such as the AI server 200.

In this instance, the self-driving vehicle 100b may directly generate results using the learning model to perform an operation, but may perform an operation by transmitting sensor information to an external device such as the AI server 200 and receiving results generated in response to this.

The self-driving vehicle 100b may determine a moving path and a running plan using at least one of map data, object information detected from sensor information, or object information obtained from an external device. The self-driving vehicle 100b may run based on the determined moving path and running plan by controlling the driver.

The map data may include object identification information for various objects disposed in the space (e.g., road) on which the self-driving vehicle 100b runs. For example, the map data may include object identification information for fixed objects, such as a streetlight, a rock, and a building, etc., and mobile objects, such as a vehicle and a pedestrian.

Furthermore, the object identification information may include a name, a type, a distance, a location, etc.

Furthermore, the self-driving vehicle 100b may perform an operation or run by controlling the driver based on a user's control/interaction. In this case, the self-driving vehicle 100b may obtain intention information of an interaction according to a user' behavior or voice speaking, may determine a response based on the obtained intention information, and may perform an operation.

AI and XR to which the Present Disclosure is Applicable

The AI technology is applied to the XR device 100c, and the XR device 100c may be implemented as a head-mount display (HMD), a head-up display (HUD) provided in a vehicle, television, a mobile phone, a smartphone, a computer, a wearable device, home appliances, a digital signage, a vehicle, a fixed robot or a mobile robot.

The XR device 100c may generate location data and attributes data for three-dimensional (3D) points by analyzing 3D point cloud data or image data obtained through various sensors or from an external device, may obtain information on a surrounding space or real object based on the generated location data and attributes data, and may output an XR object by rendering the XR object. For example, the XR device 100c may output an XR object including additional information for a recognized object by making the XR object correspond to the corresponding recognized object.

The XR device 100c may perform the above operations using a learning model consisting of at least one artificial neural network. For example, the XR device 100c may recognize a real object in 3D point cloud data or image data using a learning model, and may provide information corresponding to the recognized real object. In this case, the learning model may have been directly trained in the XR device 100c or may have been trained in an external device such as the AI server 200.

In this instance, the XR device 100c may directly generate results using a learning model and perform an operation, but may perform an operation by transmitting sensor information to an external device such as the AI server 200 and receiving results generated in response to this.

AI, Robot and Self-Driving to which the Present Disclosure is Applicable

The AI technology and the self-driving technology are applied to the robot 100a, and the robot 100a may be implemented as a guidance robot, a transport robot, a cleaning robot, a wearable robot, an entertainment robot, a pet robot, an unmanned aerial robot, etc.

The robot 100a to which the AI technology and the self-driving technology are applied may mean a robot itself having a self-driving function, or may mean the robot 100a interacting with the self-driving vehicle 100b.

The robot 100a with the self-driving function may collectively refer to devices that move by itself along a given path without control of a user or determine by itself a moving path and move.

The robot 100a with the self-driving function and the self-driving vehicle 100b may use a common sensing method to determine one or more of a moving path or a running plan. For example, the robot 100a with the self-driving function and the self-driving vehicle 100b may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or an operation associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if it is determined that a driver is in a drowsiness state, the robot 100a may activate the self-driving function of the self-driving vehicle 100b or assist control of a driving unit of the self-driving vehicle 100b. Herein, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information including signal information, etc., as in a smart traffic light, and may automatically connect an electric charger to a filling inlet through an interaction with the self-driving vehicle 100b as in the automatic electric charger of an electric vehicle.

AI, Robot and XR to which the Present Disclosure is Applicable

The AI technology and the XR technology are applied to the robot 100a, and the robot 100a may be implemented as a guidance robot, a transport robot, a cleaning robot, a wearable robot, an entertainment robot, a pet robot, an unmanned aerial robot, a drone, etc.

The robot 100a to which the XR technology is applied may mean a robot that is a target of control/interaction within an XR image. In this case, the robot 100a is different from the XR device 100c, and they may operate in conjunction with each other.

If the robot 100a that is a target of control/interaction within the XR image obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at time of the robot 100a remotely operating in conjunction through an external device such as the XR device 100c, may adjust a self-driving path of the robot 100a through an interaction, may control an operation or driving, or may identify information of a surrounding object.

AI, Self-Driving and XR to which the Present Disclosure is Applicable

The AI technology and the XR technology are applied to the self-driving vehicle 100b, and the self-driving vehicle 100b may be implemented as a mobile robot, a vehicle, an unmanned aerial vehicle, etc.

The self-driving vehicle 100b to which the XR technology is applied may mean a self-driving vehicle provided with a means for providing an XR image or a self-driving vehicle that is a target of control/interaction within the XR image. Particularly, the self-driving vehicle 100b that is the target of control/interaction within the XR image is different from the XR device 100c, and they may operate in conjunction with each other.

The self-driving vehicle 100b provided with the means for providing the XR image may obtain sensor information from sensors including a camera, and may output the XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least a part of the XR object may be output to overlap with a real object toward which a passenger's view is directed. On the other hand, when the XR object is output to a display included within the self-driving vehicle 100b, at least a part of the XR object may be output to overlap with an object within a screen. For example, the self-driving vehicle 100b may output XR objects corresponding to objects, such as a carriageway, other vehicles, a traffic light, a signpost, a two-wheeled vehicle, a pedestrian, and a building.

If the self-driving vehicle 100b that is a target of control/interaction within an XR image obtains sensor information from sensors including a camera, the self-driving vehicle 100b or the XR device 100c may create an XR image based on the sensor information, and the XR device 100c may output the created XR image. Furthermore, the self-driving vehicle 100b may operate based on a control signal received through an external device, such as the XR device 100c, or a user's interaction.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution or a clean-state structure of an existing mobile communication network structure.

The 5G system is defined as service-based, and the interaction between network functions (NFs) in architecture for the 5G system can be represented in two ways as follows.

Reference point representation: shows the interaction between NF services in NFs described by a point-to-point reference point (e.g., N11) between two NFs (e.g., AMF and SMF).

Service-based representation: network functions (e.g., AMF) within a control plane (CP) enable other authorized network functions to access their services. This representation also includes a point-to-point reference point, if necessary.

Overview of 3GPP System

FIG. 4 illustrates various reference points.

In an example of a network structure illustrated in FIG. 4, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions of security procedures, terminal-to-network session handling, idle terminal location management, etc.

The SGSN handles all packet data such as mobility management and authentication of the user for another 3GPP network (e.g., GPRS network).

The ePDG serves as a security node for an untrusted non-3GPP network (e.g., I-WLAN, WiFi hotspot, etc.).

As described with reference to FIG. 4, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 4, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

FIG. 5 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 5, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The S1 interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 6 illustrates an example of a general architecture of E-UTRAN and EPC.

As illustrated in FIG. 6, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging generation in the EPC, management of an LTE_IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

FIG. 7 illustrates an example of a structure of a radio interface protocol in a control plane between a UE and eNB. FIG. 8 illustrates an example of a structure of a radio interface protocol in a user plane between a UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OSI) standard model that is well known in the art of communication systems.

The layers of the radio protocol in the control plane illustrated in FIG. 7 and the layers of the radio protocol in the user plane illustrated in FIG. 8 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel Data is transferred between different physical layers, i.e., between physical layers of a transmission side and a reception side via the physical channel The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer illustrated in FIG. 7 is described in detail below.

The evolved session management (ESM) belonging to the NAS layer performs functions such as default bearer management and dedicated bearer management, and is responsible for controlling the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

FIG. 9 illustrates a general architecture of NR-RAN.

Referring to FIG. 9, the NR-RAN node may be one of the followings.

gNB providing NR user plane and control plane protocols towards the UE; or ng-eNB providing E-UTRA user plane and control plane protocols towards the UE.

The gNB and the ng-eNB are interconnected with each other by means of the Xn interface. The gNB and ng-eNB are also interconnected with the access and mobility management function (AMF) by means of the NG interface to 5GC, more specifically, by means of the NG-C interface, and are interconnected with the user plane function (UPF) by means of the NG-U interface (see 3GPP TS 23.501 [3]).

For reference and F1 interface for functional split are defined in 3GPP TS 38.401 [4].

FIG. 10 illustrates an example of general functional split between NG-RAN and 5GC.

Referring to FIG. 10, yellow boxes depict logical nodes, and white boxes depict main functions.

The gNB and ng-eNB host the following functions.

Functions for Radio Resource Management: radio bearer control, radio admission control, connection mobility control, and dynamic allocation of resources to UEs in both uplink and downlink (scheduling);

IP header compression, encryption and integrity protection of data;

Selection of an AMF at IMT-2000 3GPP-UE attachment when no routing to an AMF can be determined from the information provided by the UE;

Routing of user plane data towards UPF(s);

Routing of control plane information towards AMF;

Connection setup and release;

Scheduling and transmission of paging messages;

Scheduling and transmission of system broadcast information (originated from the AMF or OAM);

Measurement and measurement reporting configuration for mobility and scheduling;

Transport level packet marking in the uplink;

Session management;

Support of network slicing;

QoS flow management and mapping to data radio bearers;

Support of UEs in RRC_INACTIVE state;

Distribution function for NAS messages;

Radio access network sharing;

Dual connectivity;

Tight interworking between NR and E-UTRA.

The AMF hosts the following main functions (see 3GPP TS 23.501 [3]).

NAS signalling termination;

NAS signalling security;

AS security control;

Inter CN node signalling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing;

SMF selection.

The UPF hosts the following main functions (see 3GPP TS 23.501 [3]).

Anchor point for intra-/inter-RAT mobility (when applicable);

External PDU session point of interconnect to data network;

Packet routing and forwarding;

Packet inspection and user plane part of policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping);

Downlink packet buffering and downlink data notification triggering.

The session management function (SMF) hosts the following main functions (see 3GPP TS 23.501 [3]).

Session management;

UE IP address allocation and management;

Selection and control of UP function;

Configure traffic steering at UPF to route traffic to proper destination;

Control part of policy enforcement and QoS;

Downlink data notification.

FIG. 11 illustrates an example of a general architecture of 5G.

The following is given a description for each reference interface and each node illustrated in FIG. 11.

An access and mobility management function (AMF) supports functions of inter-CN node signaling for mobility between 3GPP access networks, termination of radio access network (RAN) CP interface (N2), termination of NAS signaling (N1), registration management (registration area management), idle mode UE reachability, support of network slicing, SMF selection, and the like.

Some or all of the functions of the AMF can be supported in a single instance of one AMF.

A data network (DN) means, for example, operator services, internet access, or 3rd party service, etc. The DN transmits a downlink protocol data unit (PDU) to the UPF or receives the PDU transmitted from the UE from the UPF.

A policy control function (PCF) receives information about packet flow from an application server and provides functions of determining policies such as mobility management and session management.

A session management function (SMF) provides a session management function. If the UE has a plurality of sessions, the sessions can be respectively managed by different SMFs.

Some or all of the functions of the SMF can be supported in a single instance of one SMF.

A unified data management (UDM) stores subscription data of user, policy data, etc.

A user plane function (UPF) transmits the downlink PDU received from the DN to the UE via the (R)AN and transmits the uplink PDU received from the UE to the DN via the (R)AN.

An application function (AF) interacts with 3GPP core network to provide services (e.g., to support functions of an application influence on traffic routing, network capability exposure access, interaction with policy framework for policy control, and the like).

A (radio) access network (R)AN collectively refers to a new radio access network supporting both evolved E-UTRA, that is an evolved version of 4G radio access technology, and a new radio (NR) access technology (e.g., gNB).

The gNB supports functions for radio resource management (i.e., radio bearer control, radio admission control, connection mobility control, and dynamic allocation of resources to UEs in uplink/downlink (i.e., scheduling)).

The UE means a user equipment.

In the 3GPP system, a conceptual link connecting between the NFs in the 5G system is defined as a reference point.

N1 is a reference point between the UE and the AMF, N2 is a reference point between the (R)AN and the AMF, N3 is a reference point between the (R)AN and the UPF, N4 is a reference point between the SMF and the UPF, N6 is a reference point between the UPF and the data network, N9 is a reference point between two core UPFs, N5 is a reference point between the PCF and the AF, N7 is a reference point between the SMF and the PCF, N24 is a reference point between the PCF in the visited network and the PCF in the home network, N8 is a reference point between the UDM and the AMF, N10 is a reference point between the UDM and the SMF, N11 is a reference point between the AMF and the SMF, N12 is a reference point between the AMF and an authentication server function (AUSF), N13 is a reference point between the UDM and the AUSF, N14 is a reference point between two AMFs, N15 is a reference point between the PCF and the AMF in case of non-roaming scenario and a reference point between the PCF in the visited network and the AMF in case of roaming scenario, N16 is a reference point between two SMFs (reference point between the SMF in the visited network and the SMF in the home network in case of roaming scenario), N17 is a reference point between AMF and 5G-equipment identity register (EIR), N18 is a reference point between the AMF and an unstructured data storage function (UDSF), N22 is a reference point between the AMF and a network slice selection function (NSSF), N23 is a reference point between the PCF and a network data analytics function (NWDAF), N24 is a reference point between the NSSF and the NWDAF, N27 is a reference point between a network repository function (NRF) in the visited network and the NRF in the home network, N31 is a reference point between NSSF in the visited network and NSSF in the home network, N32 is a reference point between security protection proxy (SEPP) in the visited network and SEPP in the home network, N33 is a reference point between a network exposure function (NEF) and the AF, N40 is a reference point between the SMF and a charging function (CHF), and N50 is a reference point between the AMF and a circuit bearer control function (CBCF).

FIG. 11 illustrates a reference model where the UE accesses to one DN using one PDU session, by way of example, for convenience of explanation, but the present invention is not limited thereto.

The following has been described based on the EPS system using the eNB for convenience of explanation. However, the EPS system may be replaced with the 5G system by replacing the eNB by the gNB, the mobility management (MM) function of the MME by the AMF, the SM function of S/P-GW by the SMF, and the user plane-related function of the S/P-GW by the UPF.

In the above, the present disclosure has been described based on the EPS, but the corresponding content can be supported by going through similar operations through processes/messages/information for similar purpose in the 5G system.

Non Public Network

A non-public network (NPN) may be implemented through an existing public network, and is defined as follows in the current standardization.

1. General

Public network (PLMN) integrated NPNs (Public-Network-Integrated-Non-Public-Network: PNI-NPN) are NPNs provided through the PLMN. For example, it may be provided through a dedicated DNN or provided by one or more network slice instances assigned to the NPN. The existing network slicing function is applied as described in clause 5.15 of 3GPP TS23.501. When the NPN is available through the PLMN, the UE has a subscription to the PLMN.

1) Note: Annex D.2 of 3GPP TS 23.501 provides additional considerations to consider when supporting a non-public network as a network slice of the PLMN.

Since network slicing cannot prevent the UE from trying to connect to the network in an area where the UE cannot use the network slice assigned to the NPN, in order to apply access control in addition to the network slicing, optionally Closed Access Groups (CAG) can be used. In the present disclosure, an access group may include the CAG.

The Closed Access Groups identifies groups of subscribers that have access one or more cells associated with the CAG.

The CAG is used in the public network integrated NPN to prevent the UE that cannot access the NPN through the connected cell from automatically selecting and accessing the relevant cell.

The following section describes functions required to support the CAG.

2. Identifier

The following are required for identification.

The CAG is identified as a unique CAG identifier within a PLMN ID range.

The CAG cell broadcasts one or more CAG identifiers per PLMN.

3) Note 1: It is assumed that the NG-RAN node supports a total of 12 CAG identifier broadcasts. Details are defined in TS 38.331.

The CAG cell may additionally broadcast a human-readable network name per CAG identifier.

4) Note 2: The human-readable network name per CAG identifier is used for presentation to the user only when the user requests manual CAG selection.

3. UE Configuration and Subscription Aspects

To support the CAG, the UE uses the UE Configuration Update procedure for access and mobility management related parameters described in section 4.2.4.2 of TS 23.502 [3], and is configured using the following CAG information included in the subscription as part of Mobility Restrictions.

an Allowed CAG list i.e. a list of CAG Identifiers the UE is allowed to access; and optionally, an indication whether the UE is only allowed to access 5GS via CAG cells (refer to TS 38.304 [50] for a method of determining whether the UE is a CAG cell).

4. Network and Cell (Re)Selection, and Access Control

The following assumptions are made for network and cell selection and access control.

The CAG cell broadcasts information so that only UEs supporting CAG can access the cell.

5) Note: The above implies that the cells are either CAG cells or general PLMN cells (non-CAG cells).

See TS 23.122 [17] for automatic and manual network selection aspects related to CAG.

See TS 38.304 [50] for aspects related to cell selection.

Mobility Restrictions should be able to restrict the mobility of the UE according to the allowed CAG list (if configured in the subscription), and indicate whether the UE can access only the CAG cell (if configured in the subscription).

During the transition from CM-IDLE to CM-CONNECTED, if the UE accesses 5GS through the CAG cell, the NG-RAN should provide the CAG identifier to the AMF.

The AMF should check whether UE access is permitted by the Mobility Restrictions.

If the CAG identifier received from the NG-RAN is included in the UE's allowed CAG list, the AMF accepts the NAS request.

If the CAG identifier received from the NG-RAN is not included in the UE's allowed CAG list, the AMF rejects the NAS request using the appropriate cause code, whereas the UE removes the corresponding CAG identifier from the list of allowed CAGs defined in TS 24.501 [47]. Then, the AMF should trigger the AN release procedure to release the NAS signaling connection for the UE.

If the UE is accessing the network through a non-CAG cell, and the UE's subscription information includes an indication that it can access only the CAG cell, the AMF rejects the NAS request with an appropriate cause code, whereas the UE updates the local configuration defined in TS 24.501. Then, the AMF should trigger the AN release procedure to release the NAS signaling connection for the UE.

During the connected mode mobility procedure:

Based on the Mobility Restrictions received from the AMF:

If the handover target cell is a CAG cell and the target cell and the related CAG identifier are not included in the UE's allowed CAG list, the source NG-RAN cannot handover the UE to the target NG-RAN node.

The source NG-RAN cannot handover the UE to a non-CAG cell if the UE can only access the CAG cell.

Update of Mobility Restrictions:

When the AMF receives the Nudm_SDM_Notification from the UDM, it is determined whether the allowed CAG list of the related UE has been changed or whether the UE is allowed to access only the CAG cell has been changed.

The AMF should update the Mobility Restrictions of the UE and the NG-RAN accordingly.

If the UE access a current CAG cell and the related CAG identifier has been removed from the allowed CAG list, or if the UE access a non-CAG cell and there is an indication that the UE can only access the CAG cell in the subscription information, the AMF releases the NAS signaling connection for the UE by triggering the AN release procedure.

According to the above description, when NPN is implemented in PLMN, specific cells may be configured as CAG cells. In addition, this CAG cell subscribes to the NPN service, and only UEs belonging to a specific CAG can use it.

In the case of a general smartphone, since it has mobility, it can be connected to a general cell other than a CAG cell in some cases. Accordingly, a network or communication service provider may deliver necessary configuration information to the UE.

Considering the types of UEs that can be seen in an environment in which NPN is used (for example, when UEs such as mechanical devices are not mobile and, according to the requirements of the factory, the mobile carrier configures NPN inside the factory), the cells in the factory will be configured as CAG cells in order for the NPN to be accessible only to UEs related to the factory.

According to the existing operation, the UE that is newly installed in the factory or has never received related configuration information from the network will not be able to connect to the network. In addition, for the wireless network, even if the communication service request of the UE is transmitted to the core network, the communication service request of the UE may be rejected. To solve this, the UE must access the network and download the configuration information before entering the NPN area or receive the configuration information in advance in another way. To this end, the entity operating the UE must know which UE is actually installed in which area and for what purpose, and accordingly, must always configure the UE in advance. Alternatively, since the UE moves and adapts to the actual operating area, there may be a problem that all configuration information must be stored in the UE in advance.

Embodiment 1

1.1

In order to solve this problem, first of all, in the present disclosure, when a certain UE is in manual network selection mode, the UE may search for available networks (PLMN and NPN) in the vicinity and present it to the user.

And, when the user selects a network corresponding to the NPN, the UE may determine whether the selected cell is a CAG cell among the cells of the network. If the selected cell is a CAG cell, if the UE has a CAG list stored in it, the UE may transmit information on the CAG selected by the user among them to the network by including it in a RRC connection request message. And, if there is no stored CAG list, the UE may transmit information corresponding to no stored CAG list or a dummy value, information corresponding to a default CAG value, or an arbitrary CAG value to the network.

The network receiving this may deliver CAG information for the corresponding UE to the AMF based on the information informed by the UE. Based on this, the AMF may determine whether to transmit configuration information to the UE by comparing the CAG information transmitted by the UE with the subscription information of the UE.

For example, when the UE sends invalid CAG information, or the UE sends CAG information corresponding to default, dummy, etc., or does not send CAG information itself, and in this situation, the UE supports a specific CAG in the accessed cell, and when the UE subscribes to the specific CAG, the AMF may not reject the registration request of the UE, and in addition, the AMF may transmit a CAG list related to the UE to the UE.

1.2

In the case of 1.1 above, if the UE sends a default or dummy value to the network, or sends an arbitrary value from the CAG list of the cell, it may be difficult for the AMF to determine whether the UE is configured for an appropriate CAG identifier.

As another way to solve this, the UE that has not been configured with the CAG identifier, may generate an arbitrary CAG identifier except for the CAG identifier transmitted from the cell where it camped, and transmit it to the network. Based on this, the network may determine that it should configure a CAG list suitable for the UE by using the difference between the CAG identifier supported by the cell and the CAG identifier transmitted by the UE.

1.3

In addition, the UE supports a CAG function by itself, but if the CAG list is not configured, through an RRC/NAS message, it may request to configure the CAG parameter. For example, in a registration message or RRC connection request message, the UE may include a message requesting update of its CAG identifier list. Based on this, the network may deliver information of the CAG identifier to the UE, if necessary.

1.4

However, in the above process, UE that supports the CAG function, but does not receive CAG identifier configuration and UE that supports the CAG function but does not subscribe to CAG service itself should be distinguished. Otherwise, the UE not subscribing to the CAG service may unnecessarily access the network, resulting in congestion. Accordingly, the UE may configure information such as No CAG identifier or CAG service is not allowed as an additional configuration value.

That is, if this information is configured, the UE determines that it cannot use the CAG service, and may not perform the above-described embodiment. However, if this information is not configured, the UE may perform the above-described embodiment. Additionally, when a UE not subscribed to the CAG service attempts to access, the network may deliver information such as "CAG service is not allowed" to the UE to prevent the UE from additionally accessing it.

1.5

In addition, the UE in the process of establishing an RRC connection with the cell, in order to prevent the cell from rejecting the RRC connection with the UE unnecessarily, in the RRC connection establishment process (for example, in RRC Connection Request message or RRC Connection Setup complete message), it may be informed that information that there is no CAG ID or SNPN ID configured to the user or that the user requests an RRC connection in order to receive an NPN-related configuration. For example, for this, a new field may be added, or one code point of the rrc connection establishment case may be used. Utilizing this, the NG-RAN additionally delivers the information in establishing a connection with the AMF, thereby avoiding the risk that the AMF unnecessarily disconnects the connection with the UE or does not provide configuration information.

The information may be delivered through NAS messages as well as RRC.

Embodiment 2

Below is one embodiment of the above-described exemplary operation.

Non Public Network

A non-public network (NPN) may be implemented through an existing public network, and is defined as follows in the current standardization.

1. General

Public network (PLMN) integrated NPNs (Public-Network-Integrated-Non-Public-Network: PNI-NPN) are NPNs provided through the PLMN. For example, it may be provided through a dedicated DNN or provided by one or more network slice instances assigned to the NPN. The existing network slicing function is applied as described in clause 5.15 of 3GPP TS23.501. When the NPN is available through the PLMN, the UE has a subscription to the PLMN.

1) Note: Annex D.2 of 3GPP TS 23.501 provides additional considerations to consider when supporting a non-public network as a network slice of the PLMN.

Since network slicing cannot prevent the UE from trying to connect to the network in an area where the UE cannot use the network slice assigned to the NPN, in order to apply access control in addition to the network slicing, optionally Closed Access Groups (CAG) can be used. In the present disclosure, an access group may include the CAG.

The Closed Access Groups identifies groups of subscribers that have access one or more cells associated with the CAG.

The CAG is used in public network integrated NPN to prevent the UE that cannot access the NPN through the connected cell from automatically selecting and accessing the related cell.

The following section describes functions required to support the CAG.

2. Identifier

The following are required for identification.

The CAG is identified by a unique CAG identifier within a PLMN ID range.

The CAG cell broadcasts one or more CAG identifiers per PLMN.

3) Note 1: It is assumed that the NG-RAN node supports a total of 12 CAG identifier broadcasts. Details are defined in TS 38.331.

The CAG cell may additionally broadcast a human-readable network name per CAG identifier.

4) Note 2: The human-readable network name per CAG identifier is used for presentation to the user only when the user requests manual CAG selection.

3. UE Configuration and Subscription Aspects

To support the CAG, the UE uses the UE Configuration Update procedure for access and mobility management related parameters described in section 4.2.4.2 of TS 23.502 [3], and is configured using the following CAG information included in the subscription as part of Mobility Restrictions.

an Allowed CAG list i.e. a list of CAG Identifiers the UE is allowed to access; and optionally, an indication whether the UE is only allowed to access 5GS via CAG cells (refer to TS 38.304 [50] for a method of determining whether the UE is a CAG cell).

4. Network and Cell (Re)Selection, and Access Control

The following assumptions are made for network and cell selection and access control.

The CAG cell broadcasts information so that only UEs supporting the CAG can access the cell.

5) Note: The above implies that the cells are either CAG cells or general PLMN cells (non-CAG cells).

See TS 23.122 [17] for automatic and manual network selection aspects related to the CAG. In the case of manual network selection, if the user selects the CAG cell, the UE may perform access the NPN through the CAG cell. If the UE supporting the CAG function does not have information about the CAG identifier in the UE, the UE may access the CAG cell. If the UE has previously been instructed that the CAG service is prohibited for the UE or the UE is configured not to subscribe to the CAG service, the UE does not attempt the CAG cell.

See TS 38.304 [50] for aspects related to cell selection.

Mobility Restrictions should be able to restrict the mobility of the UE according to the allowed CAG list (if configured in the subscription), and indicate whether the UE can access only the CAG cell (if configured in the subscription).

During the transition from CM-IDLE to CM-CONNECTED, if the UE accesses 5GS through the CAG cell, the NG-RAN should provide the CAG identifier to the AMF.

The UE includes the selected CAG identifier in the RRC/NAS message transmitted to the NG-RAN.
  If the network is manually selected and if the UE does not have information about the configured CAG identifier: The UE should do the following instead.
  Includes information that "CAG identifier is not configured"
  Includes dummy/default CAG identifier or
  Includes the cell's broadcast CAG identifier, or
  Includes any CAG identifier different from the CAG identifier broadcast in the cell, or The NG-RAN dilivers the CAG identifier to the AMF.
  When the UE indicates that the CAG identifier is not configured, or the UE includes a dummy/default CAG identifier, or the UE indicates the CAG identifier that is not broadcast in the cell, the NG-RAN delivers the CAG identifier supported by the NG-RAN to the AMF.

The AMF should check whether UE access is permitted by the Mobility Restrictions.

If the CAG identifier received from the NG-RAN is included in the UE's allowed CAG list, the AMF accepts the NAS request.

When the CAG identifier received from the NG-RAN/UE is a dummy/default CAG identifier,
or if there is no CAG identifier configured in the UE
or if the UE is not configured as the CAG identifier
  The AMF/core network uses the UE Configuration Update procedure for access and mobility management related parameters described in TS 23.502[3] of 4.2.4.2, and configures the UE using the following CAG information included in the subscription as part of the Mobility Restrictions.

an Allowed CAG list i.e. a list of CAG Identifiers the UE is allowed to access; and optionally, an indication whether the UE is only allowed to access 5GS via CAG cells (refer to TS 38.304 [50] for a method of determining whether the UE is a CAG cell), including the cell's broadcast CAG identifier If the CAG identifier to which the UE subscribes is included in the list of CAG identifiers supported by the NG-RAN according to UE subscription information
  The AMF may continue to use AN connections and provide connection services if permitted under the conditions below Alternatively, if the CAG identifier to which the UE is subscribed is not included in the list of CAG identifiers supported by the NG-RAN according to the UE subscription information
  The AMF should trigger the AN release procedure to release the NAS signaling connection for the UE.

When the subscription information of the UE indicates that there is no subscription CAG identifier for the UE:
  The AMF rejects the NAS request with an appropriate cause code (i.e. indicating that CAG service is forbidden for the UE).

If the CAG identifier received from the NG-RAN is not included in the UE's allowed CAG list, the AMF rejects the NAS request using the appropriate cause code, whereas the UE removes the corresponding CAG identifier from the list of allowed CAGs defined in TS 24.501. Then, the AMF should trigger the AN release procedure to release the NAS signaling connection for the UE.

If the UE is accessing the network through a non-CAG cell, and the UE's subscription information includes an indication that it can access only the CAG cell, the AMF rejects the NAS request with an appropriate cause code, whereas the UE updates the local configuration defined in TS 24.501. Then, the AMF should trigger the AN release procedure to release the NAS signaling connection for the UE.

During the connected mode mobility procedure:

Based on the Mobility Restrictions received from the AMF:

If the handover target cell is a CAG cell and the related CAG identifier of the corresponding target cell is not included in the UE's allowed CAG list, the source NG-RAN cannot handover the UE to the target NG-RAN node.

The source NG-RAN cannot handover the UE to the non-CAG cell if the UE can access only the CAG cell.

Update of Mobility Restrictions:

When the AMF receives the Nudm_SDM_Notification from the UDM, it is determined whether the allowed CAG list of the related UE has been changed or whether the UE is allowed to access only the CAG cell has been changed.

The AMF should update the Mobility Restrictions of the UE and the NG-RAN accordingly.

If the UE access a current CAG cell and the related CAG identifier has been removed from the allowed CAG list, or if the UE access the non-CAG cell and there is an indication that the UE can only access the CAG cell in the subscription information, the AMF releases the NAS signaling connection for the UE by triggering the AN release procedure.

Embodiment 3

Whether a UE supports the NPN function itself or not, and whether access is allowed accordingly, and if a UE supports the NPN function itself, and whether the UE can connect to any NPN network or not is a matter determined according to the security environment configuration of the NPN operator. Therefore, by providing a device that can support this more flexibly, there is a need for a method of supporting each operator to flexibly cope with changes and alterations in security strategies.

3.1

For this, in the present disclosure, the cell informs the network corresponding to the SNPN IDs supported in the cell in the assigned cell of stand-alone NPN (SNPN) of whether the UE, which does not yet have configuration information, can access the corresponding cell, and if the UE does not have configuration information for the cell, the UE may operate as follows.
- If the cell transmits information that the UE that does not have configuration information, subscription information, etc. for the SNPN ID notified by the cell camps on the cell or that access to the cell is permitted, the UE may try camp on and registration by selecting the corresponding cell.
- If the cell transmits information that the UE that does not have configuration information, subscription information, etc. for the SNPN ID notified by the cell cannot camps on the cell or that access to the cell is not permitted, the UE does not select the corresponding cell but searches for another cell and tries camp on and registration.

In a similar way, for a public network integrated NPN (hereinafter referred to as PNI-NPN), when the corresponding PNI-NPN informs the UEs of information on CAG IDs connected to the PNI-NPN, a cell of the corresponding PNI-NPN may additionally broadcast information on which UEs can camp on or access the cell. For example, the following information may be transmitted.
- Whether the UE that does not support the NPN can camp on the cell,
- Whether the UE without the subscribed or configured NPN information can camp on the corresponding cell
- For the CAG ID broadcasting in the corresponding cell, whether NPN UE without subscription or configuration information can camp on Accordingly, the UE may operate as follows For example, if a CAG list is transmitted from a cell of a certain PNI-NPN, and there is no CAG listed in the corresponding CAG list in the configuration information and environment information of a certain UE,
- When the following information is transmitted from the PNI-NPN as described above, the UE camps on the cell of the PNI-NPN and attempts registration.
  - When the UE, which does not support the NPN in the corresponding cell, announces that it can camp on, or
  - When the UE without a subscribed or configured NPN information announces that it can camp on, or
  - For the CAG ID broadcast in the corresponding cell, when an NPN UE without subscription or configuration information announces that it can camp on The UE does not camp on the cell of the PNI-NPN when the following information is transmitted in the PNI-NPN as described above, and attempts to camp on and register for other cells in the vicinity.
- If the UE that does not support the NPN in the corresponding cell announces that it cannot camp on, or
- If the UE without subscribed or configured NPN information announces that it cannot camp on, or
- For the CAG ID broadcasting in the corresponding cell, when the NPN UE without subscription or configuration information announces that it cannot camp on 3.1.1

Support for Non-Public Networks

1. General

Non-Public Network (NPN) is 5GS built for non-disclosure. See TS 22.261 [2]. The NPN may be arranged as follows.
Stand-alone Non-Public Network (SNPN), that is, when it is operated by an NPN operator and does not depend on the network functions provided by the PLMN
Public network integrated NPN, that is, a non-public network built with the support of the PLMN.
The SNPN 5GS arrangement is based on the structure described in clause 4.2.3 and the additional functions covered in clause 5.30.2.
Public network integrated NPN may be activated using network slicing (see Annex D). To prevent unauthorized UE from attempting to access the public network integrated NPN, the Closed Access Group (CAG) function described in Section 5.29.3 may additionally be used.

2. Stand-Alone Non-Public Networks

1) Identifier

The combination of a PLMN ID and a network identifier (NID) identifies the SNPN.
Note 1: The PLMN ID used for the SNPN does not need to be unique. The PLMN IDs reserved for use by non-public networks can be used for non-public networks, for example, based on Mobile Country Code (MCC) 999 as assigned by ITU [78].
NID must support two allocation models.
Locally managed NIDs are assumed to be individually selected by the SNPN at arrangement time (and therefore may not be unique).
Universally managed NIDs are assumed to be globally unique.
Optionally, a human-readable network name helps to identify the SNPN during manual SNPN selection.

2) Broadcast System Information

The NG-RAN node providing access the SNPN broadcasts the following information.
One or more the PLMN IDs
Note 1: The PLMN ID used for SNPN does not have to be globally unique. For example, a non-unique PLMN ID reserved for a non-public network can be used based on the mobile country code 999 assigned by ITU [78].

NID list for each identified PLMN ID to access the non-public network provided by NG-RAN Note 2: It is assumed that the NG-RAN node supports a total of 12 NID broadcasts. Details are defined in TS 38.331 [28].

Reference 3: If there is a list of NIDs for the PLMN ID, it indicates that the related PLMN ID and NID identify the SNPN.

Optionally human-readable network name per NID.

Note 4: The human-readable network name per NID is only used for manual SNPN selection. The manner in which the human-readable network name is provided to the UE (i.e. broadcast or unicast) is specified in TS 38.331 [28].

As described in TS 38.331 [28] and TS 38.304 [50], optional information for the UE that does not support the SNPN to be rejected from an accessing cell (for example, if the cell supports only access of non-public networks).

With respect to the information on whether the UE that does not have subscription/configuration for the combination of NID and PLMN ID that the cell broadcasts can access this cell and attempt to access and register, if it indicates that this information is allowed, the UE supporting NID/PLMN combination without subscription/configuration may camp on this cell and attempt to register. If it indicates that this information is not allowed, the UE without subscription/configuration for NID/PLMN combination should avoid this cell and try to camp on in another cell.

3) UE Configuration and Subscription Aspects

The SNPN-enabled UE is configured with a subscriber identifier and credentials for one or more SNPNs identified by a combination of PLMN ID and NID.

The subscribers of SNPN are identified by SUPI including Network Specific Identifier (NAI) using NAI RFC 7542 [20]-based user identifier defined in TS 23.003 [19] clause 28.2.2. The region portion of the NAI may include the NID of the SNPN.

SNPN-capable UEs support SNPN access mode. If the UE is configured to operate in SNPN access mode, the UE selects and registers the SNPN via Uu as described in clause 5.30.2.4.

Emergency service is not supported in the SNPN access mode.

Note 1: Voice support using the emergency services in the SNPN access mode is not specified in this release.

Even if the SNPN is activated, if it is not configured to operate in the SNPN access mode, the UE does not select and register with the SNPN. The UE not configured to operate in the SNPN access mode performs the PLMN selection procedure as defined in clause 4.4 of TS 23.122 [17].

Note 2: The details of activation and deactivation of the SNPN access mode are determined by the UE implementation.

4) Network Selection in SNPN Access Mode

When the UE is configured to operate in the SNPN access mode, the UE does not perform the normal PLMN selection procedure defined in clause 4.4 of TS 23.122 [17].

The UE operating in the SNPN access mode reads the list of available PLMN IDs and available NIDs in broadcast system information and takes them into account when selecting the network.

For automatic network selection, the UE selects the available SNPN identified by the PLMN ID and NID of the SUPI and credentials the UE has and attempts to register. If the SUPI and credentials that the UE has are available for multiple SNPNs, the priority for selection and registration in the SNPN is based on the UE implementation.

The UE for manual network selection operating in the SNPN access mode provides the user with a list of NIDs, which is associated with the human-readable name (if available) of available SNPNs in the SUPI and credentials the UE has.

Reference: SNPN selection details are defined in TS 23.122 [17].

When the UE performs initial registration with the SNPN, the UE should indicate the selected NID and the corresponding PLMN ID to the NG-RAN, and the NG-RAN should inform the AMF of the selected PLMN ID and the NID.

5) Network Access Control

When the UE performs the registration or service request procedure in the SNPN identified by the PLMN ID and the locally managed NID and there is no subscription to the UE, the AMF should reject the UE with the appropriate cause code to temporarily prevent the UE from automatically selecting and registering with the same SNPN.

When the UE performs the registration or service request procedure in the SNPN identified by the PLMN ID and the universally managed NID, and there is no subscription to the UE, the AMF should reject the UE with the appropriate cause code to permanently prevent the UE from automatically selecting and registering with the same SNPN.

Reference: The details of rejection and cause codes are defined in TS 24.501 [47].

In order to prevent SNPN access the authenticated UE in case of network congestion/overload, unified access control information is configured for each non-public network (i.e. as part of the subscription information that the UE has for a given non-public network).

6) Cell (Re)Selection in SNPN Access Mode

The UE operating in SNPN access mode selects only the cell and network that broadcast both the PLMN ID and NID of the selected SNPN.

Reference: Details of the NR idle mode procedure for SNPN cell selection are defined in TS 38.331 [28] and TS 38.304 [50].

7) Access PLMN Services Through Stand-Alone Non-Public Networks

The UE in SNPN access mode successfully registered with SNPN to access PLMN service may perform another registration with the PLMN through the SNPN, according to the same structural principle as specified in clause 4.2.8 and the SNPN acting as "Untrusted non-3GPP access".

8) Access Stand-Alone Non-Public Network Services Through PLMN

The UE that has successfully registered with the PLMN to access the SNPN service may perform another registration with the SNPN through the PLMN, according to the same structural principles as specified in Section 4.2.8 and the PLMN acting as "Untrusted non-3GPP access".

3. Public Network Integrated NPN

1) General

A public network integrated NPN is an NPN provided through a PLMN, for example provided through a dedicated DNN or provided by one or more network slice instances assigned to the NPN. Existing network slicing functions apply as described in clause 5.15. When the NPN is available through the PLMN, the UE has a subscription to the PLMN.

Reference: Appendix D provides additional considerations when supporting Non-Public networks as the network tmffkdltm of the PLMN.

Since network slicing cannot prevent the UE from attempting to access the network in an area where the UE cannot use the network slice assigned to the NPN, it can optionally use Closed Access Group in addition to network slicing in order to apply access control.

A Closed Access Group identifies a subscriber group that can access one or more CAG cells related to the CAG.

The CAG is used for public network integrated NPN to prevent the UE that cannot access NPN through the connected cell from automatically selecting and accessing the related cell.

The following section describes functions required to support the CAG.

2) Identifier

The following are required for identification.
The CAG is identified as a unique CAG identifier within the PLMN ID range.
The CAG cell broadcasts one or more CAG identifiers per PLMN.
Note 1: It is assumed that the NG-RAN node supports broadcasting of a total of 12 CAG identifiers. Details are defined in TS 38.331 [28].
The CAG cells may additionally broadcast human-readable network names per CAG identifier.
Note 2: The human-readable network name per CAG identifier is used to present to the user only when the user requests manual CAG selection.

3) UE Configuration and Subscription Aspects

To support the CAG, the UE uses the UE Configuration Update procedure for access and mobility management-related parameters described in TS 23.502[3] of 4.2.4.2, and is configured using the following CAG information included in the subscription as part of Mobility Restrictions.
an Allowed CAG list i.e. a list of CAG Identifiers the UE is allowed to access; and
optionally, an indication whether the UE is only allowed to access 5GS via CAG cells (See TS 38.304 [50] for a method of determining whether the UE is a CAG cell).

4) Network and Cell (Re)Selection, and Access Control

The following assumptions are made for network and cell selection and access control.
The CAG cell broadcasts information on whether the UE is accessed to the cell according to subscription to the supported CAG IDs broadcast by the corresponding cell. When this information is displayed, the UE without configuration/subscription information for the CAG ID indicated by the cell may camp on and attempt registration. When it is indicated that this information is not allowed, the UE without configuration/subscription information for the CAG ID indicated by the cell should not select a cell and try to camp on another cell.
The CAG cell broadcasts information on whether the UE without subscription/configuration of CAG ID broadcast by the cell can camp on the cell and attempt access and registration.
In the case of a UE that does not have any configuration/configuration of CAG ID broadcast by the cell:
When the broadcast information indicates information that the UE without subscription/configuration of the CAG ID broadcast by cell can camp on the cell and attempt access and registration, the UE selects this cell and attempts to register.
When the broadcast information indicates information that the UE without subscription/configuration of the CAG ID broadcast by the cell cannot camp on the cell and cannot attempt access and registration, the UE does not select this cell and attempts to camp on another cell.
Reference: The above also implies that the cell is a CAG cell or a general PLMN cell.
See TS 23.122 [17] for automatic and manual network selection aspects related to CAG.
See TS 38.304 [50] for aspects related to cell selection
The Mobility Restrictions should be able to restrict the mobility of the UE according to the Allowed CAG list, and include an indicator of whether the UE can access only the CAG cell (if configured in the subscription).
During the transition from CM-IDLE to CM-CONNECTED, if the UE accesses 5GS through the CAG cell, the NG-RAN should provide the CAG identifier to the AMF.
The AMF should check whether the UE access is allowed by the Mobility Restrictions.
If the CAG identifier received from the NG-RAN is included in the Allowed CAG list of the UE, the AMF accepts the NAS request.
If the CAG identifier received from the NG-RAN is not included in the Allowed CAG list of the UE, the AMF rejects the NAS request using the appropriate cause code, while the UE removes the corresponding CAG identifier from the Allowed CAG list defined in TS 24.501 [47]. Then, the AMF should trigger the AN release procedure to release the NAS signaling connection for the UE.
If the UE is accessing the network through a non-CAG cell, and the UE's subscription includes an indication that it can access only the CAG cell, the AMF rejects the NAS request with the appropriate cause code, while the UE updates the local configuration defined in TS 24.501 [47]. Then, the AMF should trigger the AN release procedure to release the NAS signaling connection for the UE.
During the connected mode mobility procedure:
Based on the Mobility Restrictions received from the AMF:
If the target is a CAG cell and the related CAG identifier are not included in the UE's allowed CAG list, the source NG-RAN cannot handover the UE to the target NG-RAN node.
The source NG-RAN cannot handover the UE to the non-CAG cell if the UE can access only the CAG cell.

Update of Mobility Restrictions:
When the AMF receives the Nudm_SDM_Notification from the UDM, the AMF determines whether to change an indicator indicating whether the UE is allowed to access only the CAG cell.
The AMF should update the Mobility Restrictions of the UE and the NG-RAN accordingly.
If the UE is accessing a current CAG cell and the related CAG identifier has been removed from the allowed CAG list, or if the UE is accessing the non-CAG cell and there is an indication that the UE can access only the CAG cell in the subscription, the AMF releases the NAS signaling connection for the UE by triggering the AN release procedure.

3.2

In the above embodiment, the UE without information on a specific NPN may attempt access the specific NPN network. As a result of the verification, the NPN network may determine that there is no service subscribed by the UE in the network, and may transmit a rejection message for a registration request or a service request of the UE. In this case, the UE still has no configuration information for the NPN, and may then attempt to register with the rejected network again. This causes unnecessary and continuous signaling congestion in the NPN.

In order to solve this, the core network may additionally deliver the following information to the UE when a UE without NPN-related information attempts access.

disallowed CAG ID or Disallowed SNPN ID

The UE receiving the information may store and manage the information in its own memory. Thereafter, the UE may not attempt to additionally register with the NPN related to the CAG ID. Preferably, in a certain cell, when the cell is related to the NPN, when there is no CAG iD licensed to the cell, and when the cell includes a CAG ID related to the disallwoed CAG ID, the UE may not select the cell and may not attempt registration.

3.2.1

As another embodiment, the network may designate a Reject cause as a not allowed CAG (or NPN) for a registration/service request of a certain UE. The UE, which received it, may manage the CAG ID or NPN ID included in the reject-related request as a prohibited CAG or the like, and may not additionally attempt a service request or registration for the NPN related thereto. For example, when a cell broadcasts a CAG ID that is forbidden to it, or when there is no CAG ID allowed to the UE in the CAG ID broadcast by a cell, and a CAG ID corresponding to a disallowed CAG ID is transmitted to the cell, the UE may not access the cell or perform a service request or registration request.

3.3

In the above-described embodiment, there may be a case where the UE registers the service again after that, and the registration of the UE is permitted again in the previously forbidden (that is, corresponding to the disallowed CAG iD) NPN. In this case, the user may use manual selection. Therefore, when the user instructs a service request/registration request through manual selection for the disallowed CAG Id, the UE may perform registration or request to the cell even if the disallowed CAG ID is indicated in the selected cell.

Embodiment 4

When a cell is used for NPN purposes, in order to increase the efficiency of wireless resource utilization of the cell, the cell may support a plurality of NPNs. In this case, when a certain UE makes a service request, in response to the UE's request, the wireless network may deliver the UE's request to the NPN intended by the UE or/and another NPN. Alternatively, if the network selects a random NPN when determining whether the UE's request is appropriate, the service request to the UE may be rejected even though the UE has appropriate subscription information. In order to solve this, the present disclosure proposes that the UE transmits NPN information desired by the UE when the UE makes a service request or registration request to the network. In addition, based on this, the network proposes to determine whether to provide a service to the UE or the authrozition of the UE.

3. Public Network Integrated NPN

1) General

A public network integrated NPN is an NPN provided through a PLMN, for example provided through a dedicated DNN or provided by one or more network slice instances assigned to the NPN. Existing network slicing functions apply as described in clause 5.15. When the NPN is available through the PLMN, the UE has a subscription to the PLMN.

Reference: Appendix D provides additional considerations when supporting Non-Public networks as the network tmffkdltm of the PLMN.

Since network slicing cannot prevent the UE from attempting to access the network in an area where the UE cannot use the network slice assigned to the NPN, it can optionally use Closed Access Group in addition to network slicing in order to apply access control.

A Closed Access Group identifies a subscriber group that can access one or more CAG cells related to the CAG.

The CAG is used for public network integrated NPN to prevent the UE that cannot access NPN through the connected cell from automatically selecting and accessing the related cell.

The following section describes functions required to support the CAG.

2) Identifier

The following are required for identification.
The CAG is identified as a unique CAG identifier within the PLMN ID range.
The CAG cell broadcasts one or more CAG identifiers per PLMN.
Note 1: It is assumed that the NG-RAN node supports broadcasting of a total of 12 CAG identifiers. Details are defined in TS 38.331 [28].
The CAG cells may additionally broadcast human-readable network names per CAG identifier.
Note 2: The human-readable network name per CAG identifier is used to present to the user only when the user requests manual CAG selection.

3) UE Configuration and Subscription Aspects

To support the CAG, the UE uses the UE Configuration Update procedure for access and mobility management-related parameters described in TS 23.502[3] of 4.2.4.2, and is configured using the following CAG information included in the subscription as part of Mobility Restrictions.
- an Allowed CAG list i.e. a list of CAG Identifiers the UE is allowed to access; and
- optionally, an indication whether the UE is only allowed to access 5GS via CAG cells (See TS 38.304 [50] for a method of determining whether the UE is a CAG cell).

4) Network and Cell (Re)Selection, and Access Control

The following assumptions are made for network and cell selection and access control.

The CAG cell broadcasts information that only UEs supporting CAG can access the corresponding cell.

Reference: The above implies that the cells are either CAG cells or general PLMN cells.
- See TS 23.122 [17] for automatic and manual network selection aspects related to the CAG.
- See TS 38.304 [50] for aspects related to cell selection.
- Mobility Restrictions should be able to restrict the mobility of the UE according to the Allowed CAG list, and include an indicator of whether the UE can access only the CAG cell (if configured in the subscription).
- During the transition from CM-IDLE to CM-CONNECTED, if the UE accesses 5GS through the CAG cell, the NG-RAN may provide an arbitrary CAG identifier to the AMF.
- If the UE is configured with the CAG identifier, the UE should indicate the selected CAG identifier to the NG-RAN with an RRC or NAS message.
- If the UE is not configured with the CAG identifier, the UE should not indicate that the CAG identifier is not configured.
- The AMF should check whether UE access is permitted by the Mobility Restrictions.
  - If an arbitrary CAG identifier is not received from the NG-RAN, the configuration is performed as described in section 5.30.3.3.;
- If the CAG identifier received from the NG-RAN is included in the UE's allowed CAG list, the AMF accepts the NAS request. The NG-RAN delivers the same CAG identifier as received from the UE to the AMF. Alternatively, the AMF uses the CAG identifier selected by the UE, received in the NAS message.
- If the CAG identifier received from the NG-RAN is not included in the UE's allowed CAG list, the AMF rejects the NAS request using the appropriate cause code, whereas the UE removes the corresponding CAG identifier from the list of allowed CAGs defined in TS 24.501 [47]. Then, the AMF should trigger the AN release procedure to release the NAS signaling connection for the UE.
- If the UE is accessing the network through the non-CAG cell, and the UE's subscription includes an indication that it can access only the CAG cell, the AMF rejects the NAS request with an appropriate cause code, whereas the UE updates the local configuration defined in TS 24.501[47]. Then, the AMF should trigger the AN release procedure to release the NAS signaling connection for the UE.

During the connected mode mobility procedure:
- Based on the Mobility Restrictions received from the AMF:
- If the target is the CAG cell and the related CAG identifier are not included in the UE's allowed CAG list, the source NG-RAN cannot handover the UE to the target NG-RAN node.
- The source NG-RAN cannot handover the UE to the non-CAG cell if the UE can access only the CAG cell.
- Update of Mobility Restrictions:
- When the AMF receives the Nudm_SDM_Notification from the UDM, the AMF determines whether to change an indicator indicating whether the UE is allowed to access only the CAG cell.
- The AMF should update the Mobility Restrictions of the UE and the NG-RAN accordingly.
- If the UE is accessing a current CAG cell and the related CAG identifier has been removed from the allowed CAG list, or if the UE is accessing the non-CAG cell and there is an indication that the UE can access only the CAG cell in the subscription, the AMF releases the NAS signaling connection for the UE by triggering the AN release procedure.

Embodiment 5

Unlike SNPN, in the case of the public network integrated NPN, the user of the UE may perform both the service to which he/she has subscribed individually (e.g. personal calls/internet use) and the public work related to his/her NPN (e.g. accessing the company network to process business) through the associated PLMN. In this case, if the cell of the public network integrated NPN is a dedicated cell, that is, a CAG cell, the UE may not be able to perform individually subscribed services. In the case of other cells (normal PLMN cells), the UE should be able to perform both services, or a situation in which services are unnecessarily disconnected should be prevented.

5.1

The following is one embodiment for achieving the above object.
- First, the UE may receive an instruction on whether to preferentially select a CAG cell or a non-CAG-cell, that is, a normal PLMN cell, according to a user's configuration (e.g. user interface) or configuration of the network (e.g. Used-Service-Unit).
- Accordingly, if instructed to preferentially select a CAG cell, the UE first searches for whether there is a CAG cell nearby, and if there is, the UE searches for whether there is a CAG ID to which the UE subscribes among the CAG IDs indicated by the corresponding cell, and if found, the UE camps on the corresponding cell and attempts registration.
- Accordingly, if instructed to preferentially select a normal cell, the UE first tries to camp on the surrounding normal PLMN cell. If all registration fails for available cells in the vicinity, the UE attempts to camp on and register the CAG cell.

FIG. 12 is an embodiment to which the present disclosure can be applied.

Referring to FIG. 12, a network node may include an NG-RAN, an AMF, and a network node that operates similarly thereto. Hereinafter, a network may include such network nodes.

The UE searches for an available network (S1210).

The UE receives information on an access group supported by the searched network from the searched network (S1220).

The UE determines whether an access group identifier included in a list of allowed access groups preconfigured in the UE is included in the information on the access group based on the information on the received access group (S1230).

The UE receives control information related to an access group for selecting the searched network from the searched network (S1240).

The UE transmits a registration request message to the searched network based on the control information (S1250).

The UE receives a response message as a response to the registration request message from the searched network (S1260).

For example, the access group information and/or control information may be generated in the AMF and transmitted to the UE through the RAN.

FIG. 13 is an embodiment of a UE to which the present disclosure can be applied.

Referring to FIG. 13, the UE searches for an available network (S1310).

The UE receives information on an access group supported by the searched network from the searched network and control information related thereto (S1320).

The UE determines whether an access group identifier included in a list of allowed access groups preconfigured in the UE is included in the information on the access group based on the information on the access group (S1330).

The UE performs the searched network and a registration procedure based on the control information (S1340).

In more detail, the access group may include a Closed Access Group (CAG). In addition, the searched network may support a Non Public Network (NPN).

In addition, the control information may include information indicating that the UE can select the searched network. For example, even when the access group identifier included in a list of allowed access groups preconfigured in the UE is not included in the information on the access group, the control information may include an indicator indicating that the UE can select the searched network.

In addition, when the UE supports a manual network selection mode, the UE may select the searched network through the manual network selection mode. For example, even when the access group identifier included in a list of allowed access groups preconfigured in the UE is not included in the information on the access group, the UE may select the searched network through the manual network selection mode.

In addition, the transmission of the registration request message may be performed even when the access group identifier is not included in the information on the access group. In more detail, through the control information, even when the identifier of the access group is not included in the information on the access group, the UE, which has received the indicator indicating that the UE can select the searched network, may transmit a registration request message to the searched network.

In addition, the information on the access group and the control information may be received through a system information block (Sib) message.

In addition, when the UE receives a message rejecting the registration request, the UE may configure not to perform a procedure for selecting the searched network or a registration request procedure on the searched network.

FIG. 14 is an embodiment of a network to which the present disclosure can be applied.

Referring to FIG. 14, a network node may include an NG-RAN, an AMF, and a network node that operates similarly thereto. Hereinafter, a network may include these network nodes. Also, the network may be a searched network as a network available to the UE.

The network transmits, to the UE, information on an access group supported by the network, and control information related to an access group for the UE to select the network (S1410).

The network receives a registration request message from the UE based on the control information (S1420).

The network transmits a response message, as a response to the registration request message, to the UE (S1430).

In more detail, the access group may be a Closed Access Group (CAG).

In addition, the network may support a Non Public Network (NPN).

In addition, the control information may include information indicating that the UE can select the network.

In addition, the information on the access group and the control information may be transmitted through a System Information Block (Sib) message.

Overview of Device to which the Present Disclosure is Applicable

FIG. 15 illustrates a block diagram of configuration of a communication device according to an embodiment of the present disclosure.

Referring to FIG. 15, a wireless communication system includes a network node 1510 and a plurality of UEs 1520.

The network node 1510 includes a processor 1511, a memory 1512, and a communication module (or transceiver) 1513. The processor 1511 may implement functions, processes, and/or methods described above with reference to FIGS. 1 to 14. Layers of wired/wireless interface protocol may be implemented by the processor 1511.

The memory 1512 is connected to the processor 1511 and stores various types of information for driving the processor 1511. The communication module 1513 is connected to the processor 1511 and transmits and/or receives wired/wireless signals. Examples of the network node 1510 may include a base station, AMF, SMF, UDF, or the like. In particular, if the network node 1510 is the base station, the communication module 1513 may include a radio frequency (RF) unit for transmitting/receiving a radio signal.

The UE 1520 includes a processor 1521, a memory 1522, and a communication module (or RF unit) (or transceiver) 1523. The processor 1521 may implement functions, processes and/or methods described above with reference to FIGS. 1 to 16. Layers of a radio interface protocol may be implemented by the processor 1521. In particular, the processor 1521 may include the NAS layer and the AS layer. The memory 1522 is connected to the processor 1521 and stores various types of information for driving the processor 1521. The communication module 1523 is connected to the processor 1521 and transmits and/or receives a radio signal.

The memories 1512 and 1522 may be inside or outside the processors 1511 and 1521 and may be connected to the processors 1511 and 1521 through various well-known means. Further, the network node 1510 (in case of the base station) and/or the UE 1520 may have a single antenna or multiple antennas.

FIG. 16 illustrates a block diagram of configuration of a communication device according to an embodiment of the present disclosure.

In particular, FIG. 16 illustrates in more detail the UE illustrated in FIG. 15. The communication module illustrated in FIG. 15 includes an RF module (or RF unit) illustrated in FIG. 16. The processor illustrated in FIG. 15 corresponds to a processor (or a digital signal processor (DSP) 1610) in FIG. 16. The memory illustrated in FIG. 15 corresponds to a memory 1630 illustrated in FIG. 16.

Referring to FIG. 16, the UE may include a processor (or digital signal processor (DSP)) 1610, an RF module (or RF unit) 1635, a power management module 1605, an antenna 1640, a battery 1655, a display 1615, a keypad 1620, a memory 1630, a subscriber identification module (SIM) card 1625 (which is optional), a speaker 1645, and a microphone 1650. The UE may also include a single antenna or multiple antennas.

The processor 1610 implements functions, processes, and/or methods described above. Layers of a radio interface protocol may be implemented by the processor 1610.

The memory 1630 is connected to the processor 1610 and stores information related to operations of the processor 1610. The memory 1630 may be inside or outside the processor 1610 and may be connected to the processors 1610 through various well-known means.

A user inputs instructional information, such as a telephone number, for example, by pushing (or touching) buttons of the keypad 1620 or by voice activation using the microphone 1650. The processor 1610 receives and processes the instructional information to perform an appropriate function, such as to dial the telephone number. Operational data may be extracted from the SIM card 1625 or the memory 1630. Further, the processor 1610 may display instructional information or operational information on the display 1615 for the user's reference and convenience.

The RF module 1635 is connected to the processor 1610 and transmits and/or receives an RF signal. The processor 1610 forwards instructional information to the RF module 1635 in order to initiate communication, for example, transmit a radio signal configuring voice communication data. The RF module 1635 includes a receiver and a transmitter to receive and transmit the radio signal. The antenna 1640 functions to transmit and receive the radio signal. Upon reception of the radio signal, the RF module 1635 may send a signal to be processed by the processor 1610 and convert the signal into a baseband. The processed signal may be converted into audible or readable information output via the speaker 1645.

FIG. 17 illustrates an example of a structure of a radio interface protocol in a control plane between a UE and eNodeB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based on three lower layers of an open system interconnection (OSI) standard model that is well known in the art of communication systems.

The layers of the radio protocol in the control plane illustrated in FIG. 19 are described below.

The physical layer, the first layer, provides an information transfer service using a physical channel. The physical layer is connected to a medium access control (MAC) layer located at a higher level via a transport channel, and data between the MAC layer and the physical layer is transferred via the transport channel Data is transferred between different physical layers, i.e., between physical layers of a transmission side and a reception side via the physical channel.

The physical channel consists of several subframes on a time axis and several subcarriers on a frequency axis. One subframe consists of a plurality of symbols and a plurality of subcarriers on the time axis. One subframe consists of a plurality of resource blocks, and one resource block consists of a plurality of symbols and a plurality of subcarriers. A unit time, a transmission time interval (TTI), at which data is transmitted, is 1 ms corresponding to one subframe.

Physical channels existing in the physical layers of the transmission side and the reception side may be divided into, according to 3GPP LTE, a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels.

The PCFICH transmitted on a first OFDM symbol of a subframe carries a control format indicator (CFI) regarding the number of OFDM symbols used for transmission of control channels in the subframe (i.e., size of a control region). A wireless device first receives the CFI on the PCFICH and then monitors the PDCCH.

Unlike the PDCCH, the PCFICH is transmitted via a fixed PCFICH resource of the subframe without the use of blind decoding.

The PHICH carries positive acknowledgement (ACK)/negative acknowledgement (NACK) signal for uplink (UL) hybrid automatic repeat request (HARQ). The ACK/NACK signal for UL data on PUSCH transmitted by the wireless device is transmitted on the PHICH.

A physical broadcast channel (PBCH) is transmitted on first four OFDM symbols of a second slot of a first subframe of a radio frame. The PBCH carries system information essential for the wireless device to communicate with the base station, and system information transmitted on the PBCH is referred to as a master information block (MIB). Compared to this, system information transmitted on the PDSCH indicated by the PDCCH is referred to as a system information block (SIB).

The PDCCH may carry resource allocation and transport format of a downlink shared channel (DL-SCH), resource allocation information of an uplink shared channel (UL-SCH), paging information on a paging channel (PCH), system information on DL-SCH, resource allocation of an upper layer control message such as a random access response transmitted on PDSCH, a set of Tx power control commands on individual UEs within an arbitrary UE group, a Tx power control command, activation of a voice over internet protocol (VoIP), etc. A plurality of PDCCHs can be transmitted within a control region, and the UE can monitor the plurality of PDCCHs. The PDCCH is transmitted on aggregation of one or multiple consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined depending on a correlation between the number of CCEs and the coding rate provided by the CCEs.

Control information transmitted on PDCCH is referred to as downlink control information (DCI). The DCI may contain resource allocation of PDSCH (which is also referred to as DL grant), resource allocation of PUSCH (which is also referred to as UL grant), a set of Tx power control commands on individual UEs within an arbitrary UE group, and/or activation of a voice over internet protocol (VoIP).

There are several layers in the second layer. First, a medium access control (MAC) layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane, according to a type of transmitted information.

The radio link control (RLC) layer of the second layer segments and concatenate data received from the upper layer and adjusts a data size so that a lower layer is adapted to transmit data to a radio section. In order to guarantee various QoS required by each radio bearer (RB), the RLC layer provides three operation modes of a transparent mode (TM), an unacknowledged mode (UM) (non-response mode), and an acknowledged mode (AM) (or response mode). In particular, the AM RLC performs a retransmission function through an automatic repeat and request (ARQ) function for reliable data transmission.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. This allows only information, that is necessarily required in a header part of data, to be transmitted, thereby increasing transmission efficiency of the radio section. In the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC_IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. Examples of the cases may include a case where transmission of uplink data is necessary for a reason of an attempt of a user to make a phone call, etc., or transmission of a response message when receiving a paging signal from the E-UTRAN.

A non-access stratum (NAS) layer performs functions such as session management and mobility management.

The NAS layer illustrated in FIG. 19 is described in detail below.

The NAS layer is divided into a NAS entity for mobility management (MM) and a NAS entity for session management (SM).

1) The NAS entity for MM generally provides the following functions.

An NAS procedure related to the AMF includes the following.

Registration management and connection management procedure. The AMF supports the functions.

Secure NAS signal connection between the UE and the AMF (integrity protection, ciphering)

2) The NAS entity for SM performs session management between the UE and the SMF.

A SM signalling message is generated and processed in the UE and the NAS-SM layer of the SMF. The content of the SM signalling message is not interpreted by the AMF.

In case of SM signalling transmission,

The NAS entity for MM generates security header indicating NAS transmission of SM signalling, and a NAS-MM message deriving a method and location of sending the SM signalling message via additional information for the received NAS-MM.

Upon reception of SM signalling, the NAS entity for SM performs integrity check of the NAS-MM message, and derives a method and place of deriving the SM signalling message by interpreting additional information.

In FIG. 17, the RRC layer, the RLC layer, the MAC layer, and the PHY layer located below the NAS layer are collectively referred to access stratum (AS) layer.

A wireless device in the present disclosure may be a base station, a network node, a transmitter UE, a receiver UE, a radio device, a wireless communication device, a vehicle, a vehicle with a self-driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

Mobile terminals disclosed in the present disclosure may include cellular phones, smart phones, laptop computers, digital broadcast terminals, personal digital assistants (PDAs), portable multimedia players (PMPs), navigators, slate PCs, tablet PCs, ultra-books, wearable devices (e.g., smart watches, smart glasses, head mounted displays (HMDs)), and the like. Furthermore, the mobile terminals may be used for controlling at least one device in an Internet of Things (IoT) environment or a smart greenhouse.

By way of non-limiting example only, further description will be made with reference to particular types of mobile terminals. However, such teachings may be equally applied to other types of mobile terminals, such as those types noted above. In addition, it can be readily apparent to those skilled in the art that these teachings can also be applied to stationary terminals such as digital TV, desktop computers, digital signage, and the like.

Hereinafter, embodiments related to a control method which can be implemented by the mobile terminal configured as above were described with reference to the accompanying drawings. It is apparent to those skilled in the art that various modifications can be made to within the range without departing from the spirit and essential features of the present invention.

The embodiments of the present disclosure described above can be implemented by various means. For example, embodiments of the present disclosure can be implemented by hardware, firmware, software, or combinations thereof.

When embodiments are implemented by hardware, a method according to embodiments of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, a method according to embodiments of the present disclosure can be implemented by devices, procedures, functions, etc. performing functions or operations described above. Software code can be stored in a memory unit and can be executed by a processor. The memory unit is provided inside or outside the processor and can exchange data with the processor by various well-known means.

The present disclosure described above can be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, and an optical data storage device, other types of storage mediums presented herein, etc. If desired, the computer-readable medium may be implemented in the form of a carrier wave (e.g., transmission over Internet). The computer may include the processor of the terminal. Accordingly, the detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

INDUSTRIAL APPLICABILITY

The communication method described above can be applied to various wireless communication systems including IEEE 802.16x and 802.11x systems, in addition to the 3GPP system. Furthermore, the proposed method can be applied to the mmWave communication system using ultra-high frequency bands.

The invention claimed is:

1. A method for a user equipment (UE) to connect to a network in a wireless communication system, the method comprising:
    searching for a network usable by the UE;
    receiving information for an access group supported by the searched network from the searched network;
    determining an access group identifier included in a list of allowed access groups preconfigured in the UE is not included in the information for the access group;
    receiving control information related to an access group for selecting the searched network from the searched network, wherein the control information indicates whether to allow access to the access group based on the access group identifier not being included in the information for the access group;
    transmitting a registration request message to the searched network based on the control information; and
    receiving a response message as a response to the registration request message from the searched network.

2. The method of claim 1, wherein the access group is a closed access group (CAG).

3. The method of claim 1, wherein the searched network supports a non public network (NPN).

4. The method of claim 1, wherein the control information includes information indicating that the UE can select the searched network.

5. The method of claim 4, further comprising:
    selecting the searched network through a manual network selection mode.

6. The method of claim 1, wherein the information for the access group and the control information are received through a system information block (SIB) message.

7. The method of claim 1, further comprising:
configuring not to perform a network selection procedure or a registration request procedure on the searched network based on the response message being a message rejecting a registration request.

8. A user equipment (UE) configured to connect to a network in a wireless communication system, comprising:
a transceiver;
at least one processor; and
at least one computer memory operably connectable to the at least one processor and storing instructions that, based on being executed by the at least one processor, perform operations comprising:
searching for a network usable by the UE;
receiving information for an access group supported by the searched network through the transceiver from the searched network;
determining an access group identifier included in a list of allowed access groups preconfigured in the memory is not included in the information for the access group;
receiving control information related to an access group for selecting the searched network through the transceiver from the searched network, wherein the control information indicates whether to allow access to the access group based on the access group identifier not being included in the information for the access group;
transmitting a registration request message to the searched network based on the control information; and
receiving a response message, as a response to the registration request message, from the searched network.

9. The UE of claim 8, wherein the access group is a closed access group (CAG).

10. The UE of claim 8, wherein the searched network supports a non public network (NPN).

11. The UE of claim 8, wherein the control information includes information indicating that the UE can select the searched network.

12. The UE of claim 11, wherein the processor selects the searched network through a manual network selection mode.

13. The UE of claim 8, wherein the information for the access group and the control information are received through a system information block (SIB) message.

14. The UE of claim 8, wherein the processor configures not to perform a network selection procedure or a registration request procedure on the searched network based on the response message being a message rejecting a registration request.

* * * * *